(12) United States Patent
Park

(10) Patent No.: US 10,584,842 B2
(45) Date of Patent: Mar. 10, 2020

(54) LAMP FOR VEHICLE AND VEHICLE

(71) Applicant: ZKW Group GmbH, Wieselburg (AT)

(72) Inventor: Jinwoo Park, Seoul (KR)

(73) Assignee: ZKW Group GmbH, Wieselburg (AT)

( * ) Notice: Subject to any disclaimer, the term of this patent is extended or adjusted under 35 U.S.C. 154(b) by 58 days.

(21) Appl. No.: 15/856,397

(22) Filed: Dec. 28, 2017

(65) Prior Publication Data

US 2018/0328563 A1 Nov. 15, 2018

(30) Foreign Application Priority Data

May 10, 2017 (KR) .......................... 10-2017-0058275

(51) Int. Cl.

| | | |
|---|---|---|
| *A61B 5/00* | (2006.01) | |
| *F21S 41/675* | (2018.01) | |
| *F21S 41/67* | (2018.01) | |
| *B60Q 1/14* | (2006.01) | |
| *F21S 41/64* | (2018.01) | |
| *G06K 9/00* | (2006.01) | |
| *F21S 41/16* | (2018.01) | |
| *B60Q 1/08* | (2006.01) | |
| *F21S 41/141* | (2018.01) | |

(Continued)

(52) U.S. Cl.

CPC ............ *F21S 41/675* (2018.01); *B60Q 1/085* (2013.01); *B60Q 1/143* (2013.01); *F21S 41/141* (2018.01); *F21S 41/16* (2018.01); *F21S 41/645* (2018.01); *F21S 41/67* (2018.01); *G06K 9/00791* (2013.01); *B60Q 1/1415* (2013.01); *B60Q 2300/054* (2013.01); *B60Q 2300/056* (2013.01); *B60Q 2300/31* (2013.01); *B60Q 2300/33* (2013.01); *B60Q 2300/45* (2013.01); *F21K 9/64* (2016.08); *F21S 41/285* (2018.01); *F21Y 2115/10* (2016.08)

(58) Field of Classification Search

CPC .. B60Q 1/00; F21S 41/00; G06K 9/00; A61B 5/00

USPC ......................................................... 382/104

See application file for complete search history.

(56) References Cited

U.S. PATENT DOCUMENTS

| | | | | |
|---|---|---|---|---|
| 2003/0047683 A1* | 3/2003 | Kaushal | ................. | G02B 23/12 250/330 |
| 2007/0102214 A1 | 5/2007 | Wittorf et al. | | |

(Continued)

FOREIGN PATENT DOCUMENTS

| | | |
|---|---|---|
| DE | 102009020910 | 11/2010 |
| EP | 2772682 | 9/2014 |

(Continued)

OTHER PUBLICATIONS

European Search Report in European Application No. 18170827.2, dated Oct. 5, 2018, 8 pages.

*Primary Examiner* — Abolfazl Tabatabai

(74) *Attorney, Agent, or Firm* — Fish & Richardson P.C.

(57) ABSTRACT

A lamp for a vehicle includes a lamp module configured to emit light; an interface unit configured to receive information; at least one processor; and a computer-readable medium having stored thereon instructions that, when executed by the at least one processor, cause the at least one processor to perform operations that include: receiving, through the interface unit, driving situation information of the vehicle; and controlling, based on the driving situation information, a resolution of light that is output from the lamp module.

21 Claims, 20 Drawing Sheets

(51) Int. Cl.
  *F21K 9/64* (2016.01)
  *F21Y 115/10* (2016.01)
  *F21S 41/20* (2018.01)

(56) References Cited

U.S. PATENT DOCUMENTS

2014/0029289 A1   1/2014   Mochizuki et al.
2015/0377442 A1  12/2015   Bhakta et al.
2016/0114720 A1   4/2016   Schlaug et al.
2016/0185276 A1   6/2016   Tanaka et al.
2017/0088036 A1*  3/2017   Roeckl .................. B60Q 1/085

FOREIGN PATENT DOCUMENTS

EP       3088249       11/2016
JP       2013184614 A   9/2013
WO      2018/114558     6/2018

* cited by examiner

LAMP FOR VEHICLE AND VEHICLE

CROSS-REFERENCE TO RELATED APPLICATION

This application claims the benefit of an earlier filing date and right of priority to Korean Patent Application No. 10-2017-0058275, filed on May 10, 2017 in the Korean Intellectual Property Office, the disclosure of which is incorporated herein by reference.

TECHNICAL FIELD

The present disclosure relates to a lamp for vehicle, and a vehicle.

BACKGROUND

A vehicle is an apparatus that moves in a direction desired by a user riding therein. A representative example of a vehicle may be an automobile.

Various lamps are typically provided in a vehicle. For example, a head lamp and a rear combination lamp are typically provided in vehicles.

Such lamps for vehicles may be classified as a lamp for facilitating visibility outside the vehicle (for example, a head lamp and a fog lamp) and a lamp for notification of a simple signal (for example, a brake lamp and a turn signal lamp).

SUMMARY

Implementations disclosed herein provide a lamp for a vehicle that is configured to adaptively control a resolution of light that is output from the lamp.

In one aspect, a lamp for a vehicle includes: a lamp module configured to emit light; an interface unit configured to receive information; at least one processor; and a computer-readable medium having stored thereon instructions that, when executed by the at least one processor, cause the at least one processor to perform operations that include: receiving, through the interface unit, driving situation information of the vehicle; and controlling, based on the driving situation information, a resolution of light that is output from the lamp module.

In some implementations, controlling the resolution of light that is output from the lamp module includes: controlling the lamp module to change a size of a smallest differentially illuminable area that is illuminated on a surface at a first distance from the lamp.

In some implementations, the operations further include: acquiring information regarding an object located outside of the vehicle; dividing a light distribution area of the lamp module into a first region corresponding to the object and a second region not corresponding to the object; and controlling a resolution of light that is output in the first region differently from a resolution of light that is output in the second region.

In some implementations, controlling the resolution of light that is output in the first region differently from the resolution of light that is output in the second region includes: controlling the lamp module to illuminate the first region with a first smallest differentially illuminable area having a first size; and controlling the lamp module to illuminate the second region with a second smallest differentially illuminable area having a second size that is different from the first size.

In some implementations, the operations further include: acquiring information regarding a relative movement of the object; and changing, based on the information regarding the relative movement of the object, a location of the first region that is illuminated by the lamp.

In some implementations, the lamp module includes: a light emitting unit; and a patterning unit configured to change a pattern of light generated by the light emitting unit. The patterning unit includes at least one of a Digital Micromirror Device (DMD) module, a Micro Electro Mechanical System (MEMS) scanner module, or a transparent display.

In some implementations, the lamp module further includes a Light Emitting Diode (LED) array including a plurality of LEDs that form a matrix array.

In some implementations, the operations further include: controlling a resolution of light that is output in an entire region of a light distribution area of the lamp module.

In some implementations, the operations further include: controlling a resolution of light that is output in a partial region of a light distribution area of the lamp module.

In some implementations, the partial region is located around a cut-off line of a low beam or a high beam generated by the lamp module.

In some implementations, the operations further include: acquiring information regarding an object located outside of the vehicle; and controlling, based on the information regarding the object, a resolution of light that is output from the lamp module.

In some implementations, the operations further include: acquiring information regarding a distance between the vehicle and the object; and controlling, based on the information regarding the distance between the vehicle and the object, a resolution of light that is output in a region corresponding to the object.

In some implementations, the operations further include: controlling the resolution of the light that is output by increasing the resolution of light that is output in the region corresponding to the object in inverse proportion to a distance between the vehicle and the object.

In some implementations, the operations further include: acquiring information regarding a type of the object; and controlling a resolution of light that is output in a region corresponding to the type of the object.

In some implementations, the operations further include: increasing the resolution of the light that is output in the region corresponding to the object based on a determination that the type of the object is a traffic sign plate, a traffic light, a person, or a nearby vehicle.

In some implementations, the operations further include: acquiring information regarding a movement of the object; and controlling the resolution of the light that is output in a region corresponding to the movement of the object.

In some implementations, the operations further include: in a state in which the object is moving, increasing the resolution of the light that is output in a region corresponding to the movement of the object.

In some implementations, the operations further include: acquiring information regarding a region defined by lines on a roadway; and controlling the resolution of light that is emitted to the region defined by the lines on the roadway.

In some implementations, the operations further include: increasing the resolution of the light that is emitted to the region defined by the lines.

In some implementations, the operations further include: acquiring information regarding a direction of travel of the vehicle; and controlling, based on the information regarding the direction of travel of the vehicle, the resolution of the light that is output from the lamp.

In some implementations, the operations further include: acquiring ambient illumination information; and controlling, based on the ambient illumination information, the resolution of the light that is output from the lamp module.

In another aspect, a vehicle includes: a plurality of wheels; a power source configured to drive a rotation of at least one of the plurality of wheels; and a lamp. The lamp includes: a lamp module configured to emit light; an interface unit configured to receive information; at least one processor; and a computer-readable medium having stored thereon instructions that, when executed by the at least one processor, cause the at least one processor to perform operations that include: receiving, through the interface unit, driving situation information of the vehicle; and controlling, based on the driving situation information, a resolution of light that is output from the lamp module.

The details of one or more implementations are set forth in the accompanying drawings and the description below. Other features will be apparent from the description and drawings, and from the claims. The description and specific examples below are given by way of illustration only, and various changes and modifications will be apparent.

DETAILED DESCRIPTION

Figure 1:
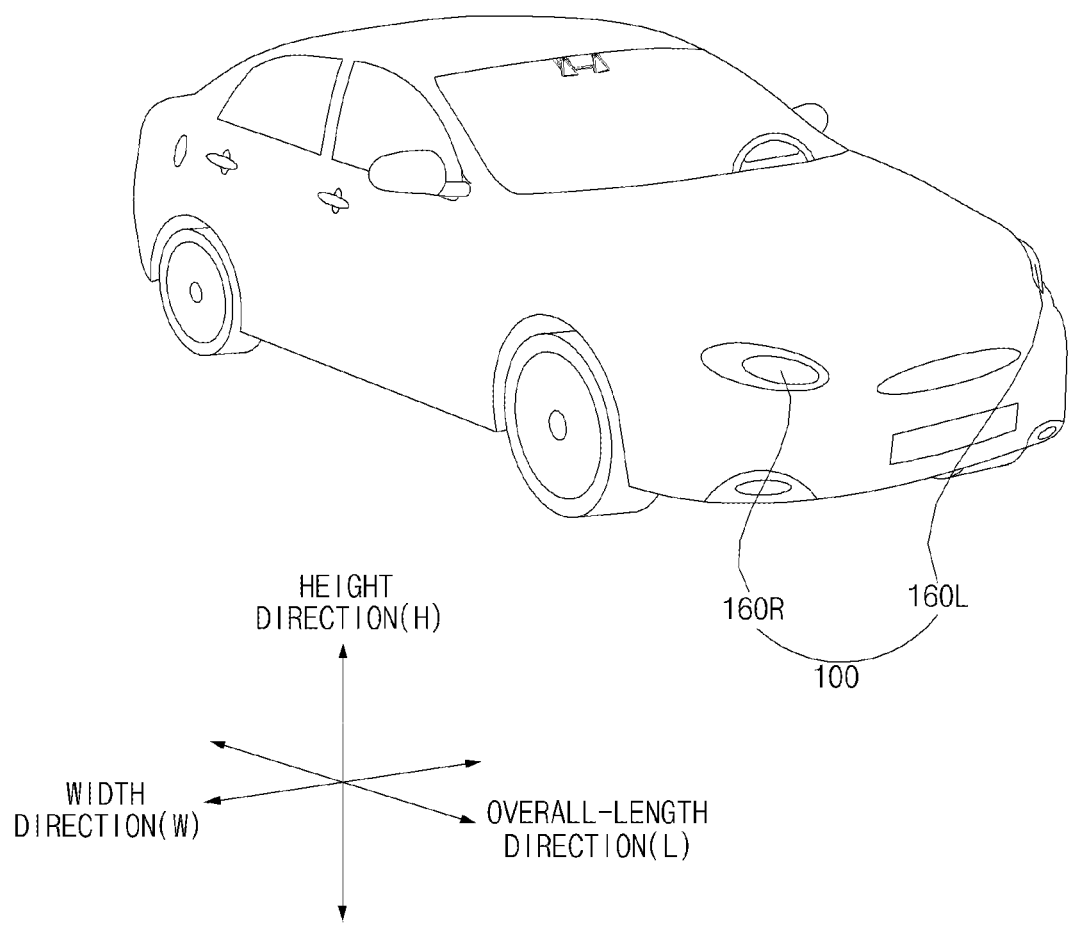
FIG. 1 is a diagram illustrating an example of an external appearance of a vehicle according to an implementation.

Lamps for vehicles are typically limited to outputting light in a uniform manner, so that precise control of light cannot be performed. In such scenarios, there may be limitations in precisely controlling a lamp to selectively provide different levels of illumination in different areas outside the vehicle.

The present disclosure has been made in view of the above problems, and it is one object of the present disclosure to provide a lamp for vehicle, which is configured to precisely control output light in various driving situations.

In some implementations, a lamp may be configured to selectively and differentially illuminate particular areas outside the vehicle. Such implementations may provide a passenger of the vehicle with improved information regarding the environment of the vehicle, and may also improve safety for others around the vehicle.

As an example, the lamp may be configured to adaptively control a resolution of light that is output from the lamp. The resolution of output light may be controlled in various ways, as described further in this disclosure. In general, resolution refers to a granularity with which a lamp can be controlled to differentially illuminate different regions in a light distribution area. As an example, resolution may relate to the size of a smallest unit of light-controllable region in the light distribution area.

For example, if there is a large output light-controllable region in a light distribution area, light may be presented with low resolution. If there is a small output light-controllable area in a light distribution area, light may be presented with high resolution. Here, the terms large/small area are used in a relative manner. In addition, high/low resolution are used in a relative manner.

In some scenarios, implementations of the present disclosure may have one or more effects as follows.

First, a lamp may be configured to precisely adjust output light to high resolution depending on a driving situation.

Second, the lamp may output light in a manner that is suitable for illuminating information that is relevant to an object adjacent to a vehicle.

Third, the lamp may help secure improved visibility for a driver of the vehicle, and also improve safety for others around the vehicle, such as an oncoming vehicle's driver, a pedestrian, and/or a preceding vehicle's driver.

Effects of the present disclosure are not limited to the aforementioned effects and other unmentioned effects will be clearly understood by those skilled in the art from the claims.

A vehicle as described in this disclosure may include any suitable motorized vehicle, such as an automobile and a motorcycle. Hereinafter, a description will be given based on an automobile.

A vehicle as described in this disclosure may be powered by any suitable source of power and include, for example, an internal combustion engine vehicle including an engine as a power source, a hybrid vehicle including both an engine and an electric motor as a power source, and an electric vehicle including an electric motor as a power source.

In the following description, "the left side of the vehicle" refers to the left side in the forward driving direction of the vehicle, and "the right side of the vehicle" refers to the right side in the forward driving direction of the vehicle.

FIG. 1 is a diagram illustrating the external appearance of a vehicle according to an implementation.

Referring to FIG. 1, a vehicle 10 may include a plurality of wheels, which are rotated by a power source, and a steering input device for controlling a driving direction of the vehicle 10.

The vehicle 10 may include a lamp 100 for vehicle.

The lamp 100 may be a head lamp or a rear combination lamp.

The following description is provided in the assumption that the lamp 100 is the head lamp, but the rear combination lamp may fall within the scope of the present disclosure.

The lamp 100 may include a low beam lamp module and a high beam lamp module.

The lamp 100 may include a left-hand head lamp module 160a, and a right-hand head lamp module 160b.

The left-hand head lamp module 160a may include a left-hand low beam lamp module, and a left-hand high beam lamp module.

The right-hand head lamp module 160b may include a right-hand low beam lamp module, and a right-hand high beam lamp module.

The lamp 100 may output either light for visibility of an occupant or light for provision of information.

The term "overall length" refers to the length from the front end to the rear end of the vehicle 10, the term "overall width" refers to the width of the vehicle 10, and the term "overall height" refers to the height from the bottom of the wheel to the roof. In the following description, the term "overall length direction L" refers to the reference direction for the measurement of the overall length of the vehicle 10, the term "overall width direction W" refers to the reference direction for the measurement of the overall width of the vehicle 10, and the term "overall height direction H" refers to n the reference direction for the measurement of the overall height of the vehicle 10.

Figure 2:
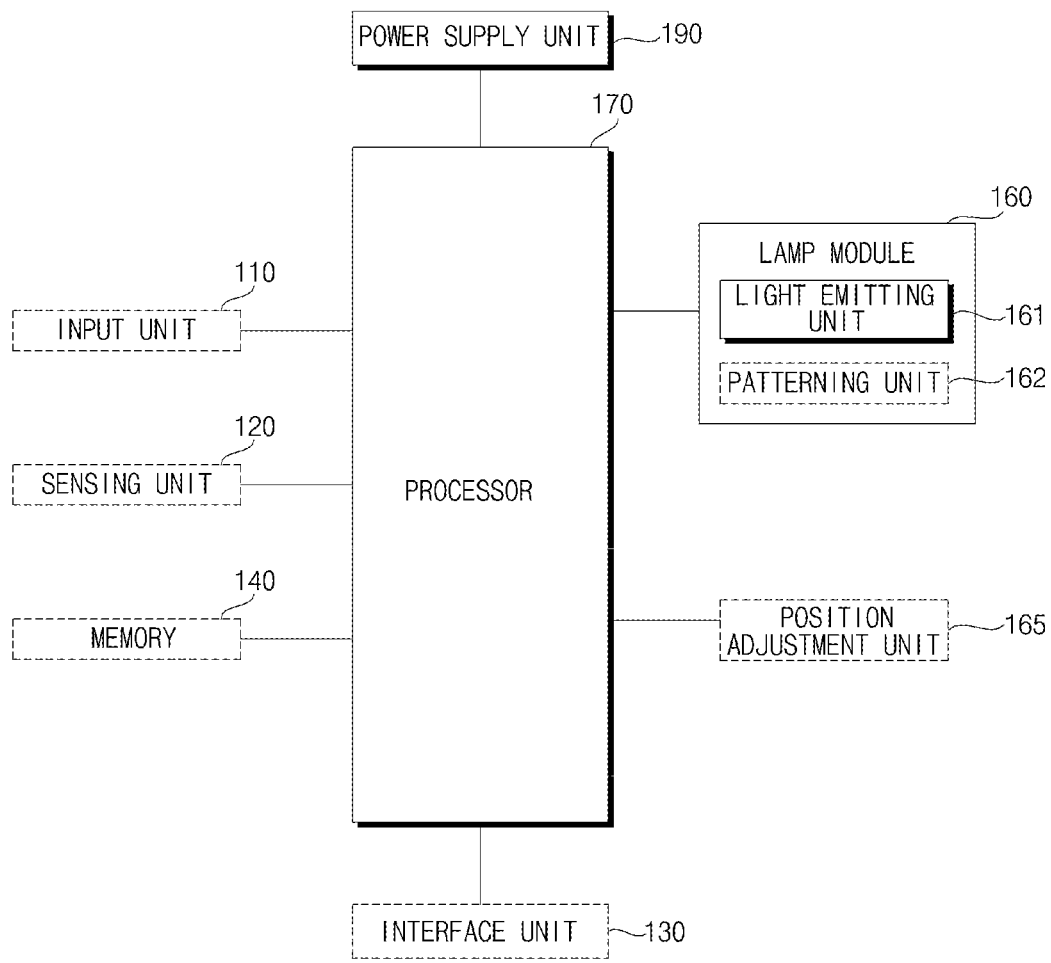
FIG. 2 is a diagram illustrating an example of a control block diagram of a laser head lamp for vehicle according to an implementation.

FIG. 2 is a control block diagram of a laser head lamp for vehicle according to an implementation.

Referring to FIG. 2, the lamp 100 may include a lamp module 160, at least one processor such as a processor 170, and a power supply unit 190.

The lamp 100 may further include an input unit 110, a sensing unit 120, an interface unit 130, a memory 140, and a position adjustment unit 165 individually or in combination.

The input unit 110 may receive a user input for controlling the lamp 100.

The input unit 110 may include at least one input device. For example, the input unit 110 may include at least one of a touch input device, a mechanical input device, a gesture input device, and a voice input device.

The input unit 110 may receive a user input for controlling operation of the lamp module 160.

For example, the input unit 110 may receive a user input to control turning on or turning off the lamp module 160.

The sensing unit 120 may include at least one sensor.

For example, the sensing unit 120 may include a temperature sensor and an illumination sensor.

The sensing unit 120 may acquire temperature information of the lamp module 160.

The sensing unit 120 may acquire information regarding illumination outside of the vehicle 10.

The interface unit 130 may exchange information, data, or a signal with another device provided in the vehicle 10.

The interface unit 130 may transfer information, data, or a signal, received from another device provided in the vehicle 10, to the processor 170.

The interface unit 130 may transmit information, data, or signal generated by the processor 170 to another device provided in the vehicle 10.

The interface unit 130 may receive driving situation information.

The driving situation information may include at least one of the following: information regarding an object outside of the vehicle 10, navigation information, and vehicle state information.

The information regarding the object outside of the vehicle 10 may include the following: information regarding presence of the object; information regarding a location of the object; information regarding movement of the object; information regarding a distance between the vehicle 10 and the object; information regarding a speed relative to the object; and information regarding a type of the object.

The object information may be generated by an object detection apparatus provided in the vehicle 10. The object detection apparatus may detect an object based on sensing data which is generated by at least one of a camera, a radar, a lidar, an ultrasonic sensor, and an infrared sensor.

An object may include a lane, a nearby vehicle, a pedestrian, a traffic signal, light, a road, a structure, a bump, a geographical feature, an animal, etc.

The navigation information may include at least one selected from among map information, information regarding a set destination, information regarding a route to the set destination, information regarding various objects along the route, lane information, and information regarding a current location of the vehicle.

The navigation information may be generated by a navigation apparatus provided in the vehicle 10.

The vehicle state information may include vehicle position information, vehicle speed information, vehicle tilt information, vehicle weight information, vehicle direction information, vehicle battery information, vehicle fuel information, vehicle tire pressure information, vehicle steering information, in-vehicle temperature information, in-vehicle humidity information, pedal position information, vehicle engine temperature information, etc.

The vehicle state information may be generated based on sensing information generated by various sensors provided in the vehicle 10.

The memory 140 may store basic data for each unit of the lamp 100, control data for the operational control of each unit, and data to be input to or output from the lamp 100.

The memory 140 may be any of various hardware storage devices, such as a ROM, a RAM, an EPROM, a flash drive, and a hard drive.

The memory 140 may store various data for the overall operation of the lamp 100, such as programs for the processing or control of the processor 170.

The memory 149 may be classified as a subordinate element of the processor 170.

The lamp module 160 may generate light and output the light. The lamp module 160 may operate based on a control signal from the processor 170.

The lamp module 160 may include a light emitting unit 161 and a patterning unit 162.

The light emitting unit 161 may include at least one light emitting element that converts electrical energy into light energy.

The light emitting unit 161 may operate based on a control signal from the processor 170.

The light emitting unit 161 may adjust resolution of output light under the control of the processor 170.

For example, the light emitting unit 161 may include at least one of light Emitting Diode (LED), a Laser Diode (LD), a metal filament lamp, a halogen bulb, a high-intensity discharge (HID) lamp, a neon gas discharge lamp.

For example, the light emitting unit 161 may include a micro LED.

For example, the light emitting unit 161 may include an LED array which includes plurality of LEDs and forms a matrix array. The LED array may control each of the LEDs under the control of the processor 170 so as to form a pattern of output light.

The patterning unit 162 may form a pattern of output light.

The patterning unit 162 may impart a specific pattern to light generated by the light emitting unit 161.

For example, the patterning unit 162 may change a pattern of light generated by the light emitting unit 161.

The patterning unit 162 may operate based on a control signal from the processor 170.

The patterning unit 162 may adjust resolution of output light, by changing a pattern of light under the control of the processor 170.

The patterning unit 162 may include at least one of a Digital-Micro-mirror Device (DMD) module, a Micro Electro Mechanical System (MEMS) scanner module, and a transparent display.

The DMD module may form a pattern of light to be output to the outside of the vehicle 10, by changing the position of each of multiple fine mirrors under the control of the processor 170.

The DMD module may adjust resolution of output light, by changing the position of each of multiple fine mirrors under the control of the processor 170.

The DMD module will be described in more detail with reference to FIG. 3.

The MEMS scanner module may form a pattern of light to be output to the outside of the vehicle 10, by changing an optical path generated using a scanner mirror under the control of the processor 170.

The MEMS scanner module may adjust resolution of output light, by changing an optical path generated using a scanner mirror under the control of the processor 170.

The MEMS scanner module will be described in more detail with reference to FIG. 4.

The transparent display may form a pattern based on an electrical signal which is applied under the control of the processor 170. As light passes through the transparent display to the outside, a pattern of light output to the outside of the vehicle 10 may be formed.

The transparent display may adjust resolution of output light by forming a pattern under the control of the processor 170.

The transparent display may include any one of a transparent TFEL, a transparent OLED, a transparent LCD, a transparent PDP, a transparent LED, and a transparent AMOLED.

The position adjustment unit 165 may adjust the position of the lamp module 160.

The position adjustment unit 165 may control the lamp module 160 to be tilted. Due to the tilting control for the lamp module 160, output light may be adjusted in a vertical direction (for example, an over-height direction).

The position adjustment unit 165 may control the lamp module 160 to be panned. Due to the panning for the lamp module 160, output light may be adjusted in a horizontal direction (for example, an over-width direction).

The position adjustment unit 165 may further include a driving power generation unit (for example, a motor, an actuator, and a solenoid) which provides driving power necessary to adjust the position of the lamp module 160.

When the lamp module 160 generates a low beam, the position adjustment unit 165 may adjust the position of the lamp module 160, so that light is output downward more than when the lamp module 160 generates a high beam.

When the lamp module 160 generates a high beam, the position adjustment unit 165 may adjust the position of the lamp module 160, so that light is output upward more than when the lamp module 160 generates a high beam.

The processor 170 may be electrically connected to each unit of the lamp 100. The processor 170 may control the overall operation of each unit of the lamp 100.

The processor 170 may acquire driving situation information through the interface unit 130.

The processor 170 may output light based on driving situation information.

Based on driving situation information, the processor 170 may control the lamp module 160 to output light for visibility.

The processor 170 may control the lamp module 160 to output light for generating an image corresponding to driving situation information.

The processor 170 may control resolution of output light from the lamp module 160 based on driving situation information.

The processor 170 may control variation in resolution of output light from the lamp module 160 based on driving situation information.

For example, based on driving situation information, the processor 270 may increase resolution of output light in a specific region of the light distribution area.

For example, based on driving situation information, the processor 170 may reduce resolution of output light in a specific region of the light distribution area.

The processor 170 may control resolution of output light by controlling the lamp module 160.

The processor 170 may control resolution of output light by controlling the light emitting unit 161.

The processor 170 may control resolution of output light by controlling the patterning unit 162.

Resolution of output light may be described as an output light-controllable region in a light distribution area.

For example, if there is a large output light-controllable region in a light distribution area, light may be presented with low resolution. If there is a small output light-controllable area in a light distribution area, light may be presented with high resolution. Here, the terms large/small area are relative. In addition, the terms high/low resolution are relative.

For example, the lamp module 160 may output light toward a road surface (light distribution area) being spaced apart a specific distance from the vehicle 10. In this case, the processor 170 may control light to be output on per first unit area in a first region of the road surface. In addition, the processor 170 may control light to be output on per second unit area in a second region of the road surface.

In this case, resolution of output light can be described based on the first unit area and the second unit area. If the second unit area is larger than the first unit area, resolution in the second region may be lower than resolution in the first region. In addition, if the first unit area is smaller than the second unit area, resolution in the first region may be higher than resolution in the second region.

In general, resolution may be determined by a size of a smallest differentially illuminable region that is illuminated on a fixed surface, such as a vertical plane at a first distance from the lamp. The smallest differentially illuminable region may be the smallest area of the vertical plane that can be illuminated differently from other areas of the vertical plane. Higher-resolution lamp configurations achieve a reduced size for this smallest differentially illuminable area.

If output light can be controlled on the basis of a smaller unit area, it can be said that output light has high resolution.

Through the interface unit 130, the processor 170 may acquire information regarding an object outside of the vehicle 10.

The processor 170 may divide a light distribution area of the lamp module 160 into a first region corresponding to the object and a second region not corresponding to the object.

The light distribution area may be an area to which light generated by the lamp module 160 is emitted.

The first region in the light distribution area may be a region in which the object is located.

The second region in the light distribution area may be a region in which the object is not located.

The processor 170 may control resolution of output light in the first region and resolution of output light in the second region to be different from each other.

For example, the processor 170 may control resolution of output light in the first region to be higher than resolution of output light in the second region.

By increasing resolution of output light in a region corresponding to an object, it is possible to output information corresponding to the object or precisely control light emitted toward the object.

The processor 170 may acquire information regarding relative movement of an object.

The information regarding relative movement of an object may be generated upon movement of at least one of the object and the vehicle 10.

Based on information regarding movement, the processor 170 may change a location of the first region corresponding to an object.

The processor 170 may control resolution of output light in an entire region of the light distribution area of the lamp module 160.

The processor 170 may control resolution of output light in a partial region of the light distribution area of the lamp module 160.

The partial region may be located in surroundings of a cut-off line of a low beam or a high beam generated by the lamp module 160.

The processor 170 may acquire information regarding an object outside of the vehicle 10.

The information regarding the object may include information regarding a distance between the vehicle 10 and the object, information regarding a type of the object, information regarding movement of the object, and information regarding a region defined by lines on a roadway.

Based on information regarding an object, the processor 170 may control resolution of output light from the lamp module 160.

The processor 170 may acquire information regarding a distance between the vehicle 10 and the object.

Based on the information regarding a distance between the vehicle 10 and the object, the processor 170 may control resolution of output light in a region corresponding to the object.

For example, the processor 170 may control resolution of output light such that resolution of output light in a region corresponding to the object increases in inverse proportion to a distance between the vehicle 10 and an object.

The processor 170 may acquire information regarding a type of the object.

Based on the information regarding a type of the object, the processor 170 may control resolution of output light in a region corresponding to the object.

For example, if an object is a traffic sign plate, a traffic light, or a nearby vehicle, the processor 170 may increase resolution of output light in a region corresponding to the object.

The processor 170 may acquire information regarding movement of an object.

Based on the information regarding movement of an object, the processor 170 may control resolution of output light in a region corresponding to the object.

For example, if an object moves, the processor 170 may increase resolution of output light in a region corresponding to the object.

The processor 170 may acquire information regarding a region defined by lines on a roadway.

The processor 170 may control resolution of output light in the region defined by lines.

For example, the processor 170 may increase resolution of output light emitted to a region defined by lines.

The processor 170 may acquire navigation information through the interface unit 130.

The navigation information may include information regarding a direction of travel of the vehicle 10.

The processor 170 may acquire information regarding a direction of travel of the vehicle 10.

The processor 170 may control resolution of output light from the lamp module 160 based on the information regarding a direction of travel of the vehicle 10.

For example, the processor 170 may increase resolution of output light in a region corresponding to a direction of travel of the vehicle 10 over the light emission area.

The processor 170 may acquire ambient illumination information.

For example, the processor 170 may acquire ambient illumination information based on an image acquired from a camera included in an object detection apparatus.

For example, the processor 170 may acquire ambient illumination information from the sensing unit 120.

The processor 170 may control resolution of output light from the lamp module 160 based on illumination information.

For example, the processor 170 may increase resolution of output light in a region which has high illumination due to additional light emitted by a different light source (for example, a streetlight and a lamp) over a light distribution area.

Under the control of the processor 170, the power supply unit 190 may supply electrical energy required for operation of each unit of the lamp 100. In particular, the power supply unit 190 may be supplied with power from a batter inside of the vehicle 10.

Figure 3:
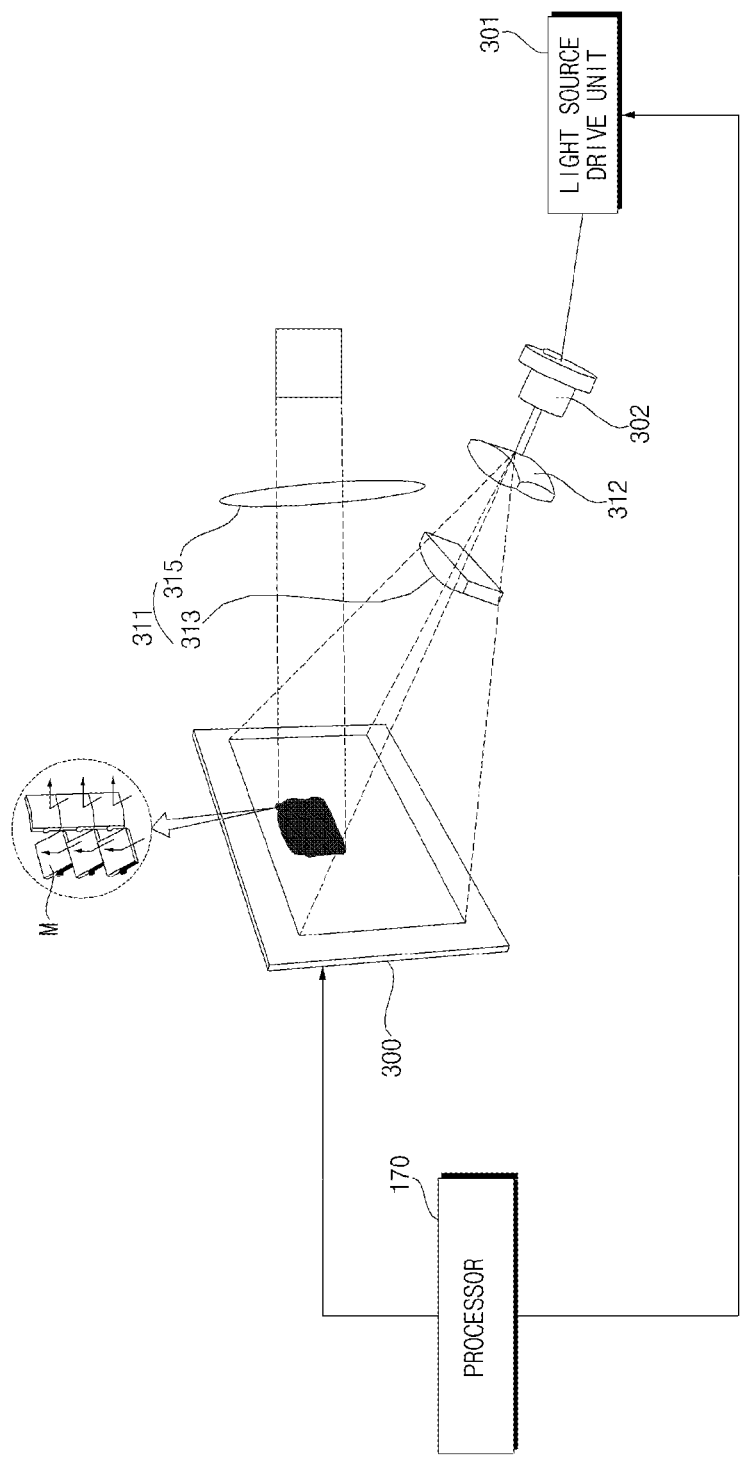
FIG. 3 is a diagram illustrating an example of a Digital-Micro-mirror Device (DMD) module according to an implementation.

FIG. 3 is a diagram for explanation of a DMD module according to an implementation.

Referring to FIG. 3, the light emitting unit 11 may include a light source 302, a light source drive unit 301, light conversion unit 312, and an optical unit 311. In addition, the patterning unit 162 may include a DMD module 300.

A light emitting element included in the light source 302 may convert electrical energy into light.

The light source drive unit 301 may provide the light source with an electrical signal for driving the light source 302. An electrical signal provided by the light source drive unit 301 may be generated by the control of the processor 170.

The light conversion unit 312 may convert a laser beam emitted by the light source 302 to a specific color. For example, while passing through the light conversion unit 312, a laser beam emitted by the light source 302 may be converted into light beams of various wavelengths. The light beams of various wavelengths may be combined to be converted into visible light of a specific color (for example, white).

The light conversion unit 312 may include at least one type of a phosphorescent material. For example, the light conversion unit 312 may include a phosphorous.

The optical unit 311 may include a first lens 313 and a second lens 315.

The first lens 313 may refract visible light incident through the light conversion unit 312, and provide the refracted visible light to the DMD module 300. The first lens 313 may refract visible light emitted by the light conversion unit 312, so that the refracted visible light is transferred to the DMD module 300. For example, the first lens 313 may be a collimator lens. An incident visible light may be collimated through the first lens 313.

The DMD module 300 may change a pattern of the incident visible light. By changing the pattern of the visible light, the DMD module 300 may display a visual image. By changing the pattern of the visible light, the DMD module 300 may change a displayed visual image.

The DMD module 300 may include a plurality of micro-mirrors M. For example, the DMD module 300 may include hundreds of thousands of micro-mirrors M.

The DMD module 300 may include: a mirror layer including a plurality of micro-mirrors; a driver layer including a plurality of hinges and a plurality of yokes formed to correspond to the plurality of micro-mirrors, respectively; a metal layer in which the plurality of yokes arrives and which supports the plurality of hinges; and a semiconductor memory (for example, a CMOS SRAM).

The plurality of yokes and the plurality of hinges in the driver layer may receive a signal from the semiconductor memory to adjust a position of each of the micro-mirrors. For example, the plurality of yokes and the plurality of hinges may or may not tilt each of the micro-mirrors in accordance with a signal from the semiconductor memory.

Under the control of the processor 170, the semiconductor memory may provide a signal for adjusting the respective positions of the micro-mirrors.

In some implementations, by controlling a tilt angle of each individual micro-mirror M, the processor 170 may be able to adjust a projection angle and/or reflectance of a visible light on the basis of a pixel unit. For example, a tilt angle of each micro-mirror M may be changed more than thousands of times per second due to a magnetic field. A projection angle of at least part of a visible light travelling from the first lens 313 to the DMD module 300 may be changed by the change of the tilt angle. Accordingly, a part of the visible light travelling from the first lens 313 may be blocked from travelling to the front of the vehicle 10.

The DMD module 300 may allow only at least part of a visible light emitted from the first lens 313 to pass through the second lens 315 and be then projected toward the front of the vehicle 10. In some implementations, the second lens 315 may be omitted.

Based on received first information, the processor 170 may control positions of at least some micro-mirrors M included in the DMD module 300 to realize a visible light in various patterns.

In some implementations, the DMD module 300 in FIG. 3 may output visible light for display of visual information and visible light for provision of visibility.

Using the DMD module 300, the processor 170 may output the visible light for display of information and the visible light for provision of visibility at a time interval. At a time interval which cannot be recognized with a human's eyes, the visible light for display of a visual image and the visible light for provision of visibility are output alternatively. In this manner, the DMD module 300 may output both the visible light for display of a visual image and visible light for provision of visibility.

In some implementations, one or more reflectors may be further included on an optical path along which light generated by the light source 302 is output to the outside.

Figure 4:
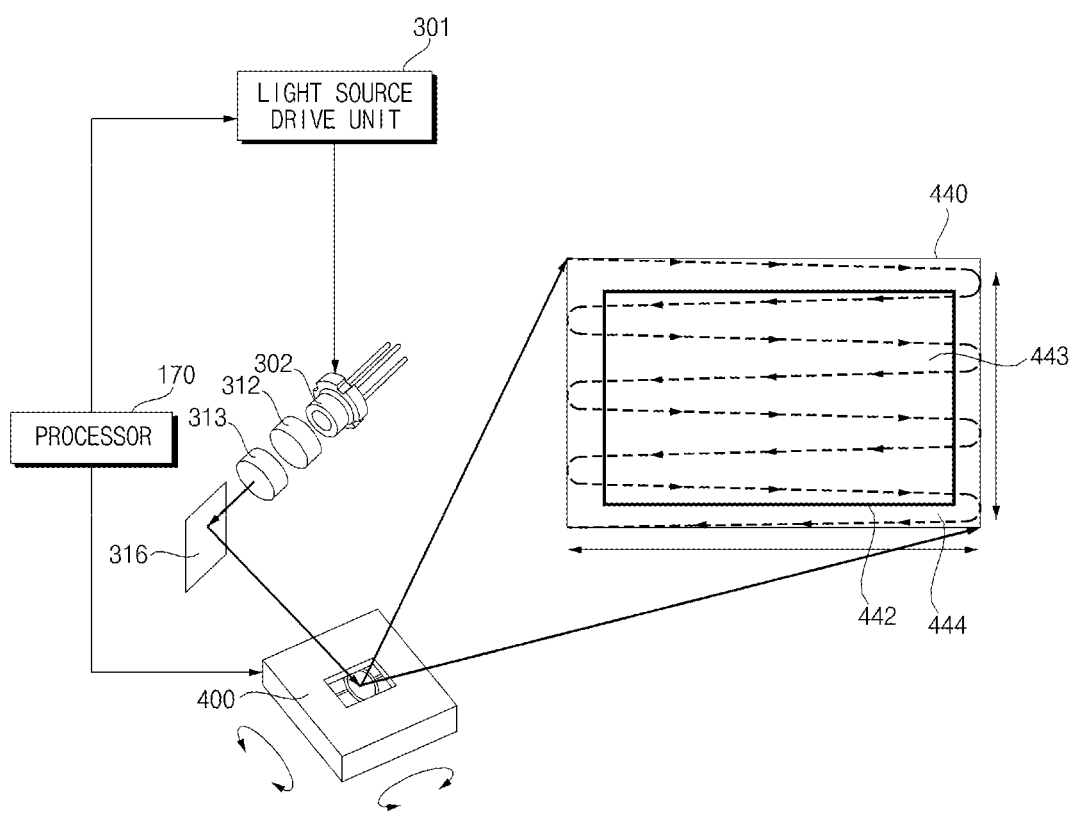
FIG. 4 is a diagram illustrating an example of a Micro Electro Mechanical System (MEMS) scanner module according to an implementation.

FIG. 4 is a diagram for explanation of an MEMS scanner module according to an implementation.

Referring to FIG. 4, the light emitting unit 161 may include a light source drive unit 301, a light source 302, a light conversion unit 312, an optical unit 313, and a reflector 316. In addition, the patterning unit 162 may include an MEMS scanner module 400.

A light emitting element included in the light source 302 may convert electrical energy into light. For example, the light source 302 may include a light Emitting Diode (LED) or a laser diode as the light emitting element. When the laser diode is used as a light source, it is possible to achieve brightness higher than when the LED is used as light source. It is hereinafter assumed that the laser diode is used as the light source 302.

The light source drive unit 301 may provide the light source 302 with an electrical signal for driving the light source 302. The electrical signal provided by the light source drive unit 301 may be generated by the control of the processor 170.

The light conversion unit 312 may convert a laser beam, emitted by the light source 302, to a specific color. For example, while passing through the light conversion unit 312, a laser beam emitted by the light source 302 may be converted into light beams of various wavelengths. The light beams of various wavelengths may be combined to be converted into visible light of a specific color (for example, white).

The light conversion unit 312 may include at least one type of phosphorescent material. For example, the light conversion unit 312 may include a phosphorous.

The optical unit 711 may include a first lens 313.

The first lens 313 may refract a visible light incident through the light conversion unit 312, and provide the refracted visible light to the MEMS scanner module 400. The first lens 131 may refract a visible light emitted from the light conversion unit 312, so that the refracted visible light is transferred to the MEMS scanner module 400. For example, the first lens 313 may be a collimator lens. An incident visible light may be collimated through the first lens 313.

The reflector 316 may change an optical path. The reflector 316 may reflect light passing through the first lens 313 to transfer the reflected light to the MEMS scanner module 400. In some implementations, the reflector 316 may be omitted.

The MEMS scanner module 400 may include a scanner mirror, a structure for supporting the scanner mirror, and a drive unit for driving the scanner mirror. For example, the drive unit may include a magnetic material. The drive unit may rotate the scanner mirror based on an electromagnetic wave generated by an applied current.

The drive unit may drive the scanner mirror by the control of the processor 170.

The scanner mirror may be rotated by the operation of the drive unit. As the scanner mirror is rotated, an optical path along which a visible light is incident on the scanner mirror may be constantly changed.

The MEMS scanner module 400 may generate a scanning path based on rotation of the scanner mirror. The scanning path may be a path along which a visible light reflected by the scanner mirror is output.

For example, the MEMS scanner module 400 may receive visible light and perform first-direction scanning and second-direction scanning sequentially and repeatedly.

As illustrated in the drawings, the scanner module 400 may perform scanning on an external region 440 over a scannable area from left to right or from right to left in a diagonal or horizontal direction. In addition, the same scanning operation may be repeatedly performed on the entire external region 400. In this manner, a projection image corresponding to visible light may be displayed outside of the vehicle 10.

By controlling rotation of the scanner mirror, the processor 170 may adjust a scanning path to realize visible light in various patterns. By controlling rotation of the scanner mirror, the processor 170 may display a visual image corresponding to first information to an area outside of the vehicle 10. By controlling rotation of the scanner mirror, the processor 170 may change a displayed visual image based on second information.

Figure 8:
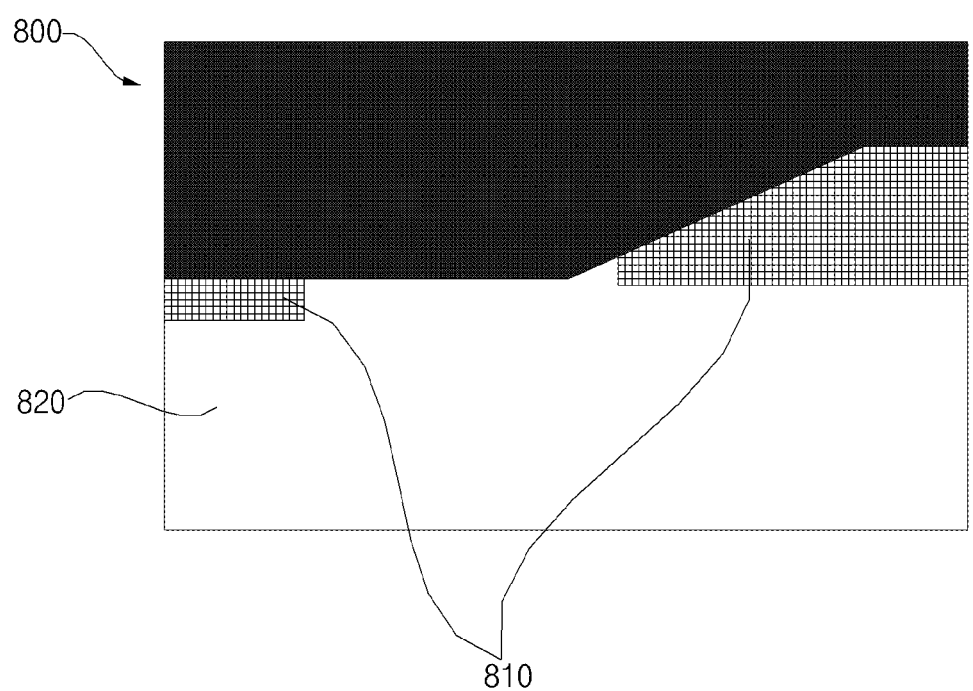

In some implementations, the MEMS scanner module 400 in FIG. 8 may output both visible light for display of a visual image and visible light for provision of visibility.

Using the MEMS scanner module 400, the processor 170 may output the visible light for display of a visual image and the visible light for provision of visibility at a time interval. At a time interval which cannot be recognized by a human's eyes, the visible light for display of a visual image and the visible light for provision of visibility are output alternatively. In this manner, the MEMS scanner module 400 may output both the visible light for display of a visual image and the visible light for provision of visibility.

Figure 5:
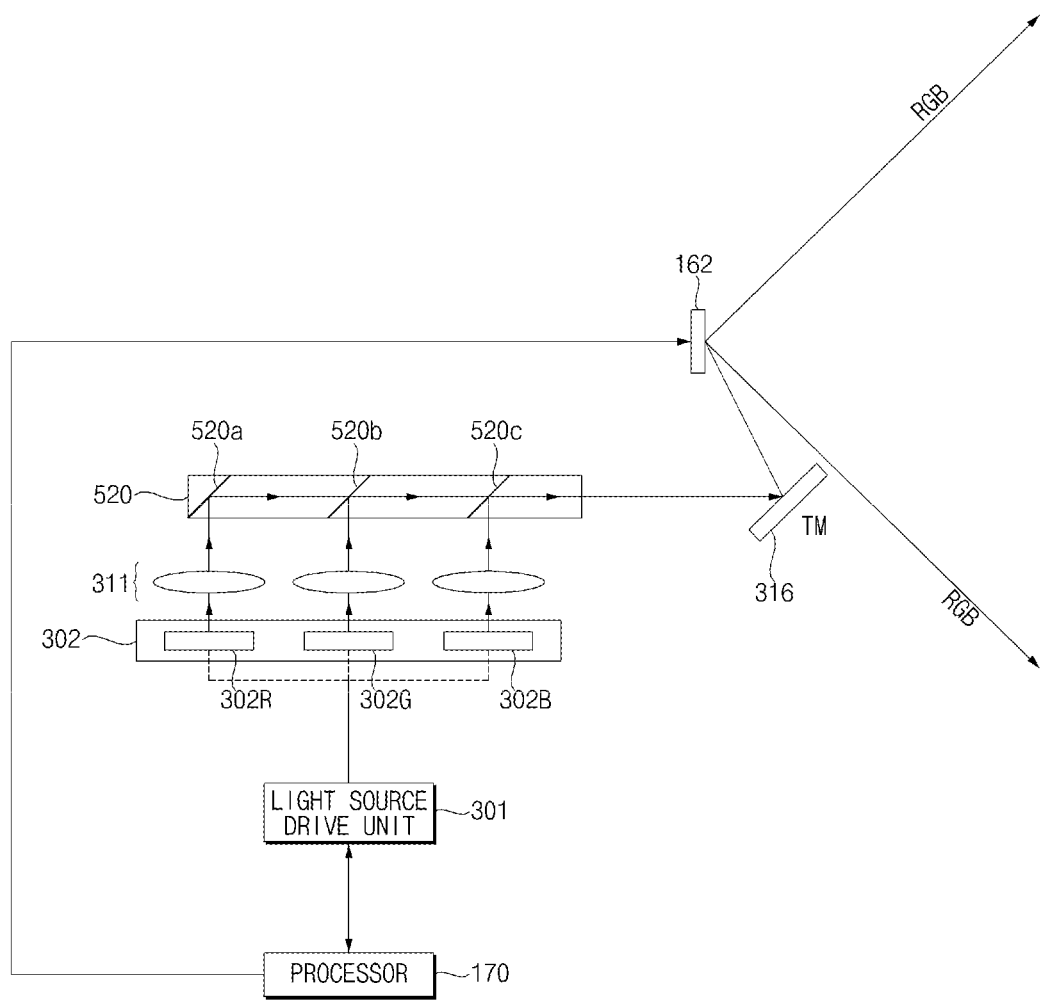
FIG. 5 is a diagram illustrating an example of a lamp for a vehicle, the lamp in which a plurality of light sources is included in a light emitting unit, according to an implementation.

FIG. 5 is a diagram for explanation of a lamp for a vehicle, the lamp in which a plurality of light sources is included in light emitting unit, according to an implementation.

Referring to FIG. 5, the light emitting unit 161 may include a light source 302, a light source drive unit 301, an optical unit 713, a light combiner 520, and a reflector 316.

The light source 302 may include a plurality of light emitting elements 302R, 302G, and 302B. For example, the light source 302 may include a red laser diode 302R, a green laser diode 302G, and a blue laser diode 302R.

The light source drive unit 301 may provide the light source 302 with an electrical signal for driving the light source 302. The electrical signal provided by the light source drive unit 301 may generated by the control of the processor 170.

Red, Green, and blue lights output from the light source 302R, 302G, and 302B may be collimated through a collimator lens included in the optical unit 311.

The light combiner 520 may combine respective lights output from the light source 302, 302G, and 302B and output a combined light in one direction. To this end, the light combiner 520 may include three 2D MEMS mirrors 520a, 520b, and 520c.

A first light combiner 520a, a second light combiner 520b, and a third light combiner 520c may respectively output a red light from the red laser diode 302R, a green light from the green laser diode 302G, and a blue light from the blue laser diode 302B in a direction toward the patterning unit 162.

The reflector 316 may reflect the red, green, and blue lights, which have passed through the light combiner 520, in a direction toward the patterning unit 162. The reflector 316 may reflect lights of various wavelengths, and, for this purpose, the reflector 316 may be implemented as a Total Mirror (TM).

Figure 6:
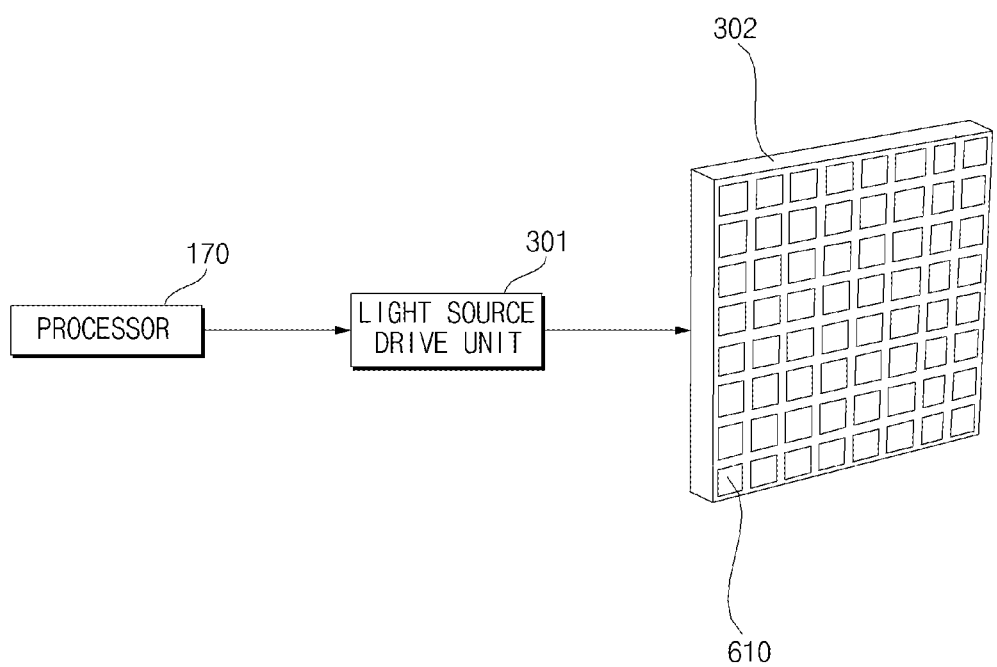
FIG. 6 is a diagram illustrating an example of a light output unit according to an implementation.

FIG. 6 is a diagram for explanation of a light output unit according to an implementation.

Referring to FIG. 6, the light source 302 may include a plurality of light emitting elements arranged in a predetermined form.

For example, the light source 302 may include a plurality of micro LEDs 610 as light emitting elements. Each of the micro LEDs 610 may be turned on and off individually by the control of the processor 170. Color and brightness of a light output from each of the micro LEDs 610 may be controlled individually by the control of the processor 170.

The processor 170 may drive each of the micro LEDs 610 individually so as to output a visible light for display of a visual image and a visible light for provision of visibility.

The processor 170 may control the micro LEDs 610 on a group-by-group unit basis. For example, the processor 170 may control a visible light for display of an image to be output from a first group of micro LEDs, and may control a visible light for provision of visibility to be output from a second group of micro LEDs.

Figure 7:
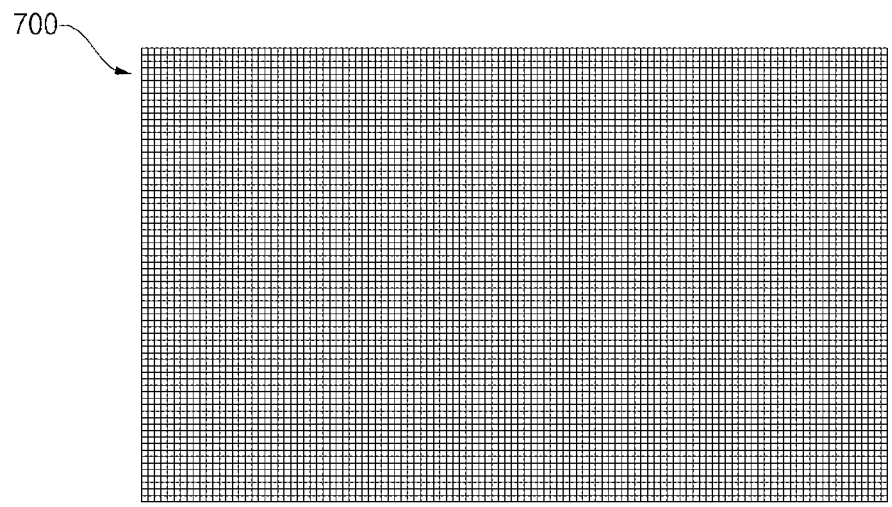
FIGS. 7 and 8 are diagrams illustrating examples of resolution of a output light according to an implementation.
Figure 7:
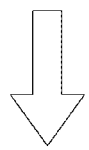
Figure 7:
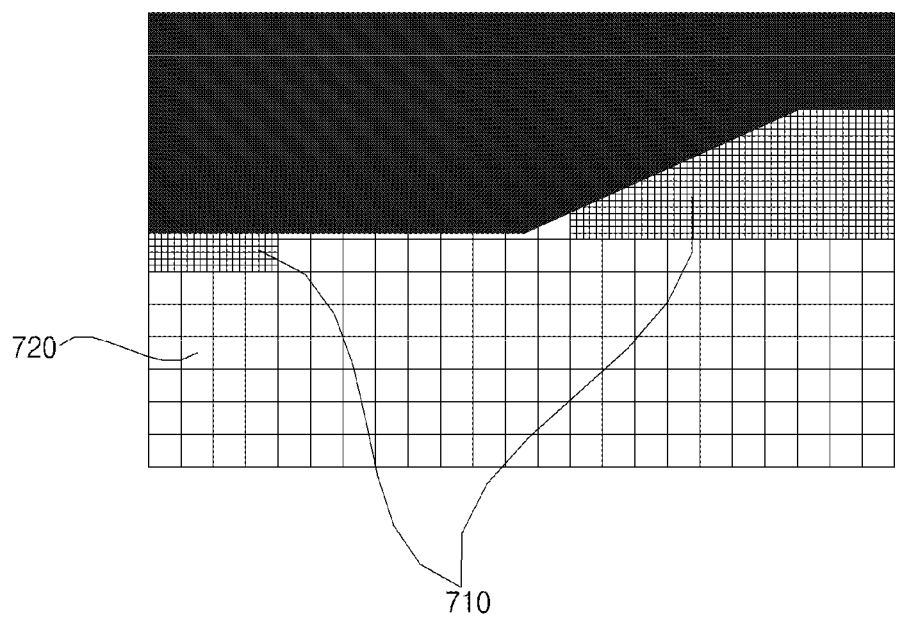

Referring to FIGS. 7 and 8 are diagrams for explanation of resolution of output light according to an implementation.

As described above, resolution of output light may be described as an area of an output light-controllable region in a light distribution area.

Referring to FIG. 7, the processor 170 may control resolution of output light over the entire region of the light distribution area 700 of the lamp module 160.

Depending on configuration or operation of the light emitting unit 161 or the patterning unit 162, the entire region of the light distribution area 700 may be classified as a resolution setting allowed region.

For example, the light emitting unit 161 may include thousands of the same-type micro LEDs in the entire region of the light distribution area 700 in order to realize high resolution of output light.

For example, the patterning unit 162 may further include a DMD module, including micro-mirrors of the same size, in the entire region of the light distribution area 700 in order to realize high resolution of output light.

For example, the patterning unit 162 may include an MEMS scanner module for forming an optical path in the entire region of the light distribution to implement high resolution of output light.

Based on driving situation information, the processor 170 may control resolution of output light in the entire region of the light distribution area 700.

The processor 170 may divide the light distribution area 700 into a first region 710 and a second region 720.

Based on driving situation information, the processor 170 may control resolution of output light in the first region 710 and resolution of output light in the second region 720 to be different from each other.

For example, the processor 170 may increase resolution of output light in the first region 710 to be higher than resolution of output light in the second region 720.

For example, the processor 170 may control output light per first unit area in the first region 710 of the light distribution area. The processor 170 may turn on and off light per first unit area in the first region 710, or may adjust the quantity of light per first unit area in the first region 710, or adjust color of light per first unit area in the first region 710.

For example, the processor 170 may control output light per second unit area in the second region 710 of the light distribution area. The processor 170 may turn on and off light per second unit area in the second region 720, adjust the quantity of light per second unit area in the second region 720, or adjust color of light per second unit area in the second region 720.

The second unit area is greater than the first unit area. In this case, resolution of output light in the first region 710 is higher than resolution of output light in the second region 720.

The processor 170 may control output light in the first region 710 more precisely than output light in the second region 720.

Referring to FIG. 8, the processor 170 may control resolution of output light in a partial region of the light distribution area of the lamp module 160.

Depending on configuration or operation of the light emitting unit 161 or the patterning unit 162, only the partial region 810 of the light distribution area 800 may be classified as a resolution setting allowed region.

For example, the light emitting unit 161 may include micro LEDs of different types in some regions 810 of the light distribution area 800 to realize high resolution of output light. At a location corresponding to a resolution setting allowed region 810, a micro LED from which light is output in a relatively narrow width may be disposed. At a location corresponding to a resolution setting non-allowed region 820, a micro LED from which light is output in a relatively wide width may be disposed.

For example, the patterning unit 162 may include a DMD module in a partial region 810 of the light distribution area 800 to realize high resolution of output light. At a location corresponding to the resolution setting allowed region 810, a relatively small-sized micro mirror may be disposed. At a location corresponding to the resolution setting non-allowed region 820, a relatively large-sized micro mirror may be disposed.

In this case, based on driving situation information, the processor 170 may control resolution of output light in the resolution setting allowed region 810.

Figure 9A:
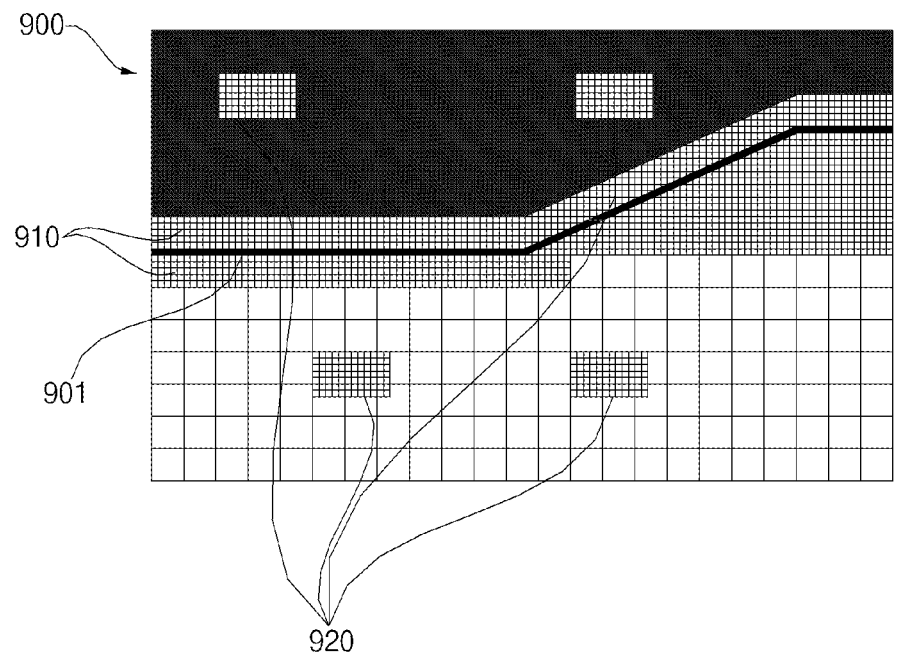
FIGS. 9A and 9B are diagrams illustrating examples of adaptively controlling resolution of an output light according to an implementation.
Figure 9B:
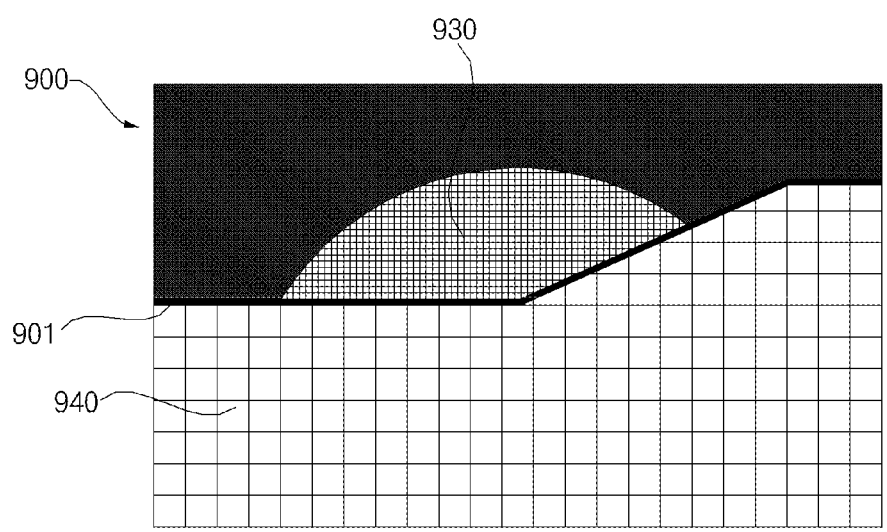

FIGS. 9A and 9B are diagrams illustrating of how to control resolution of output light according to an implementation.

Referring to FIG. 9A, the processor 170 may control resolution of output light in partial regions 910 and 920 of a light distribution area.

The processor 170 may increase resolution of output light in the regions 910 surrounding a cut-off line of a low beam or a high beam generated by the lamp module 160, so that the resolution of output light in the region 910 is higher than resolution of output light in other regions.

The cut-off line 901 may be described as a line for distinguishing an emission region and a non-emission region to prevent glare to an opposing driver. The cut-off line 901 may be formed by the patterning unit 162. The patterning unit 162 may generate a cut-off line.

With reference to the cut-off line 901, a region for visibility for an occupant of the vehicle 10 is determined. By increasing resolution of output light in the region 910 surrounding the cut-off line 901, it is possible to precisely control output light in the surroundings of the cut-off line based on driving situation information.

The processor 170 may increase resolution of output light in a region 910 corresponding to an object outside of the vehicle 10 in a light distribution area, so that the resolution of output light in the region 910 is higher than resolution of output light in other regions.

The processor 170 may move the region 910 in response to relative movement of the object.

Referring to FIG. 9B, the processor 170 may control resolution of output light in a partial region 930 in a light distribution area of the lamp module 160.

The processor 170 may control resolution of output light such that resolution of output light in a region 930 in front of (or above) a cut-off line 901 becomes higher than resolution of output light in a region 940 behind (or below) the cut-off line 901.

The region 940 behind (or below) the cut-off line 901 is a region in which light has to be emitted to secure visibility.

The region 930 in front of (or above) the cut-off line 901 is a region in which light is desirably emitted to secure visibility, but, in the presence of an opposing vehicle, a preceding vehicle, or a pedestrian, emission of light needs to be restricted not to cause glare to the opposing vehicle, the preceding vehicle, or the pedestrian.

As output light is controlled more precisely by increasing resolution of output light in the region 930 in front of (or above) the cut-off line 901, it is possible to secure the maximum visibility and prevent glare to other people as much as possible.

Figure 10:
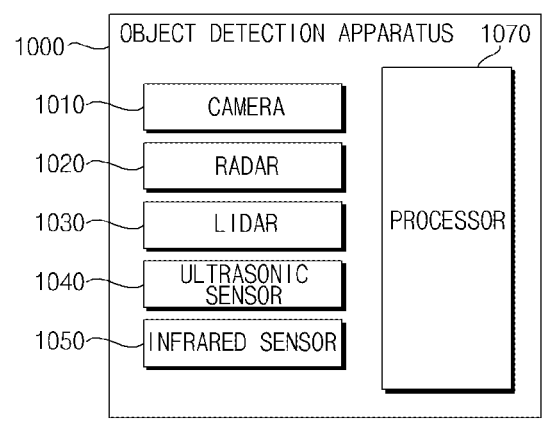
FIGS. 10, 11, and 12 are diagrams illustrating examples of an object detection apparatus according to an implementation.
Figure 11:
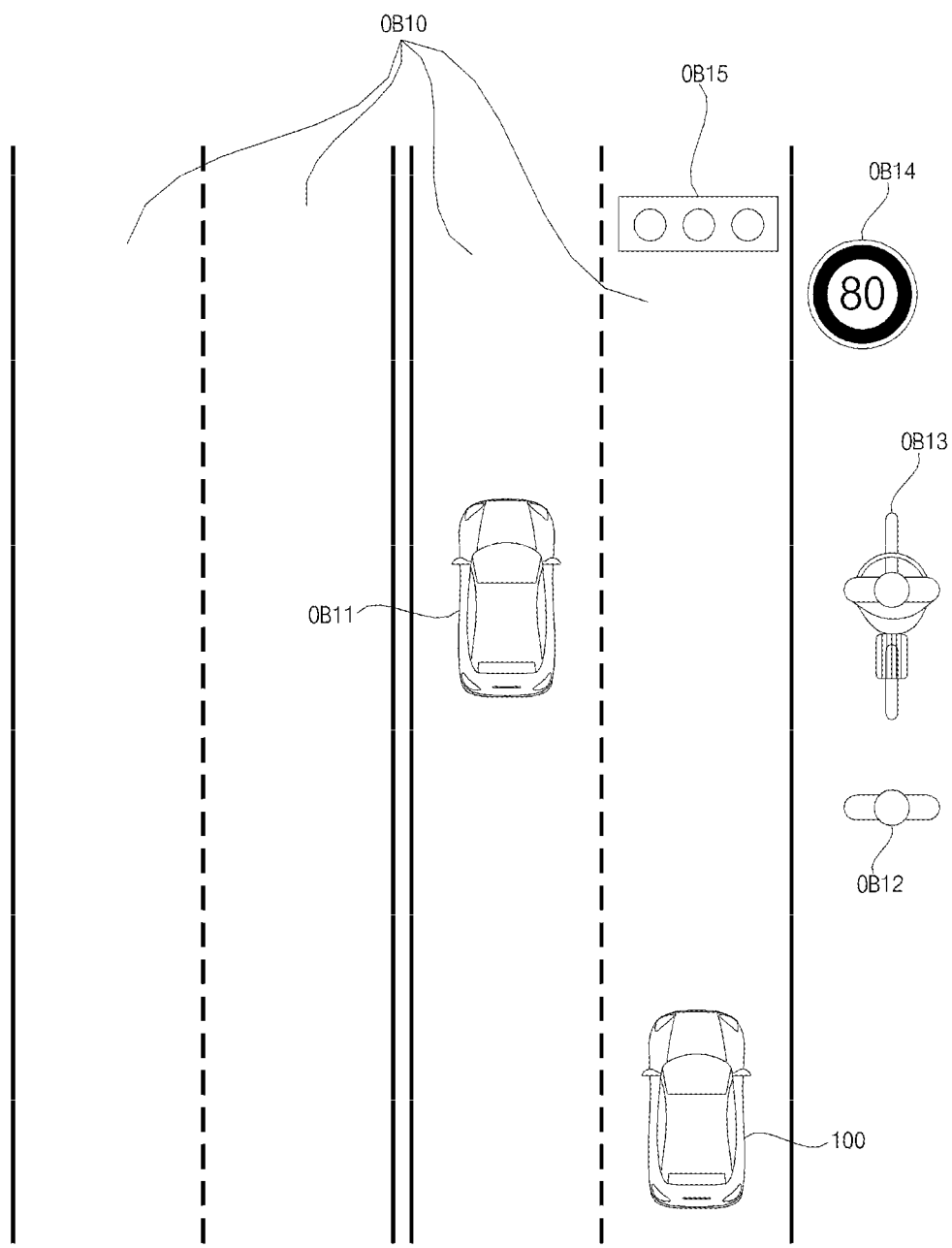
Figure 12:
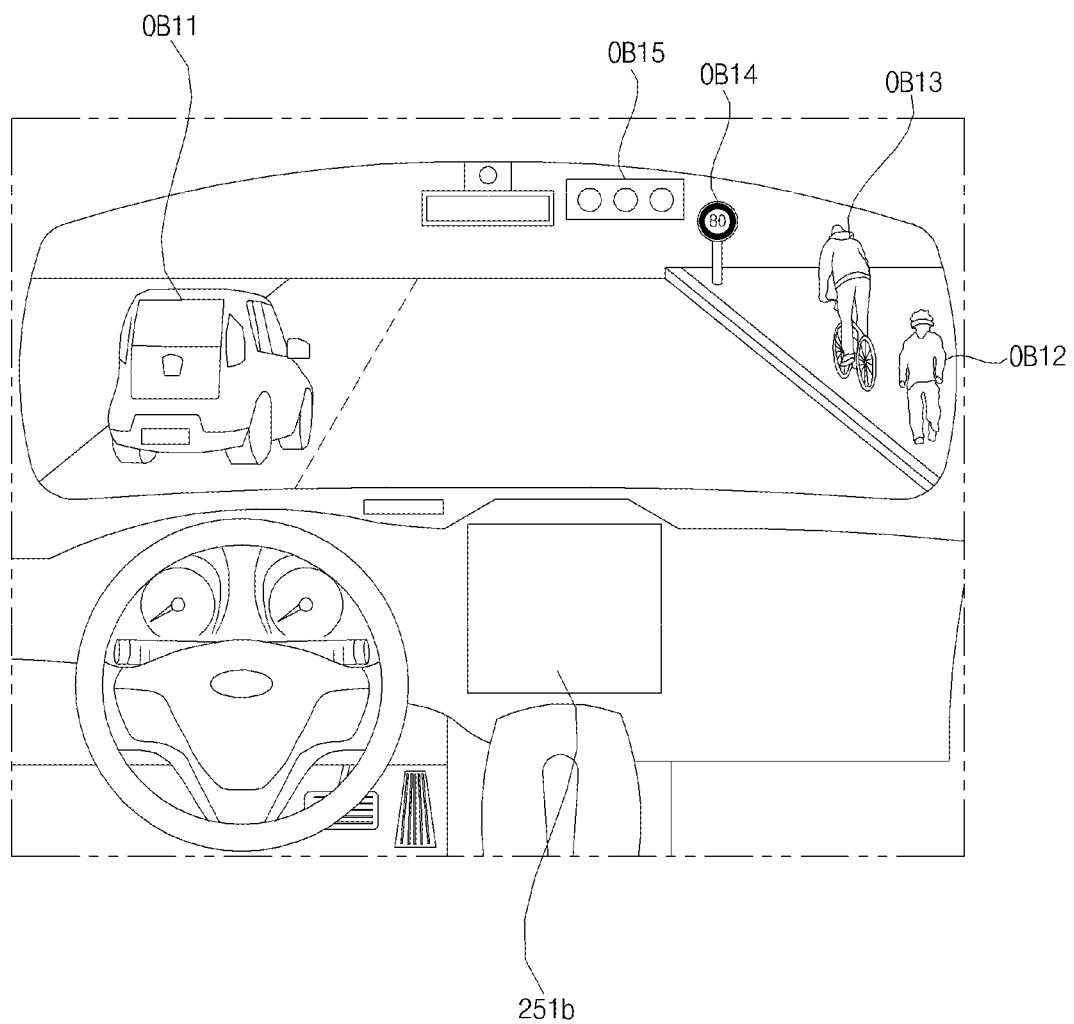

FIGS. 10 and 12 are diagrams illustrating an object detection apparatus according to an implementation.

Referring to FIGS. 10 and 12, the vehicle 10 may include an object detection apparatus 1000.

The lamp 100 and the object detection apparatus 1000 may perform wired/wireless communication with each other.

The object detection apparatus 1000 is an apparatus for detecting an object located outside of the vehicle 10. The object detection apparatus 1000 may generate object information based on sensing data.

The object information may include information regarding presence of an object, information regarding a location of the object, information regarding a distance between the vehicle 10 and the object, and information regarding a speed of the vehicle 10 relative to the object.

The object may be various object related to travelling of the vehicle 10.

Referring to FIGS. 5 and 6, an object O may include a lane OB10, a nearby vehicle OB11, a pedestrian OB12, a two-wheeled vehicle OB13, a traffic signal OB14 and OB15, light, a road, a structure, a bump, a geographical feature, an animal, etc.

The lane OB10 may be a lane in which the vehicle 10 is traveling or a lane next to the lane in which the vehicle 10 is traveling. The lane OB10 may include left and right lines that define the lane. The lane may include an intersection.

The nearby vehicle OB11 may be a vehicle that is travelling in the vicinity of the vehicle 10. The nearby vehicle OB11 may be a vehicle within a predetermined distance from the vehicle 10. For example, the nearby vehicle OB11 may be a vehicle that is preceding or following the vehicle 10.

The pedestrian OB12 may be a person in the vicinity of the vehicle 10. The pedestrian OB12 may be a person within a predetermined distance from the vehicle 10. For example, the pedestrian OB12 may be a person on a sidewalk or on the roadway.

The two-wheeled vehicle OB13 is a vehicle that is located in the vicinity of the vehicle 10 and moves with two wheels. The two-wheeled vehicle OB13 may be a vehicle that has two wheels within a predetermined distance from the vehicle 10. For example, the two-wheeled vehicle OB13 may be a motorcycle or a bike on a sidewalk or the roadway.

The traffic signal may include a traffic light OB15, a traffic sign plate OB14, and a pattern or text painted on a road surface.

The light may be light generated by a lamp provided in the nearby vehicle. The light may be light generated by a street light. The light may be solar light.

The road may include a road surface, a curve, and slopes, such as an upward slope and a downward slope.

The structure may be a body located in the vicinity of the road in the state of being fixed onto the ground. For example, the structure may include a streetlight, a roadside tree, a building, a traffic light, and a bridge.

The geographical feature may include a mountain and a hill.

In some implementations, the object may be classified as a movable object or a stationary object. For example, the movable object may include a nearby vehicle and a pedestrian. For example, the stationary object may include a traffic signal, a road, and a structure.

The object detection device 100 may include a camera 1010, a radar 1020, a lidar 1030, an ultrasonic sensor 1040, an infrared sensor 1050, and at least one processor such as a processor 1070.

In some implementations, the object detection device 1000 may further include other components in addition to the aforementioned components, or may not include some of the aforementioned components.

The camera 1010 may be located at an appropriate position outside the vehicle 10 in order to acquire images of the outside of the vehicle 10. The camera 1010 may be a mono camera, a stereo camera 1010a, an Around View Monitoring (AVM) camera 1010b, or a 360-degree camera.

Using various image processing algorithms, the camera 1010 may acquire information regarding a location of an object, and information regarding a distance to the object, or information regarding a speed relative to the object.

For example, the camera 1010 may acquire the information regarding a distance to the object and information regarding a speed relative to the object based on a variation in size of the object over time in acquired images.

For example, the camera 1010 may acquire information regarding a distance to the object or information regarding a speed relative to the object by employing a pin hole model or by profiling a road surface.

For example, the camera 1010 may acquire information regarding a distance to the object and information regarding a speed relative to the object based on information regarding disparity in stereo images acquired from the stereo camera 1010a.

For example, the camera 1010 may be disposed near a front windshield in the vehicle 10 in order to acquire images of the front of the vehicle 10. Alternatively, the camera 1010 may be disposed around a front bumper or a radiator grill.

For example, the camera 1010 may be disposed near a rear glass in the vehicle 10 in order to acquire images of the rear of the vehicle 10. Alternatively, the camera 1010 may be disposed around a rear bumper, a trunk, or a tailgate.

For example, the camera 1010 may be disposed near at least one of the side windows in the vehicle 10 in order to acquire images of the side of the vehicle 10. Alternatively, the camera 1010 may be disposed around a side mirror, a fender, or a door.

The camera 1010 may provide an acquired image to the processor 1070.

The radar 1020 may include an electromagnetic wave transmission unit and an electromagnetic wave reception unit. The radar 1020 may be realized as a pulse radar or a continuous wave radar depending on the principle of emission of an electronic wave. In addition, the radar 1020 may be realized as a Frequency Modulated Continuous Wave (FMCW) type radar or a Frequency Shift Keying (FSK) type radar depending on the waveform of a signal.

The radar 1020 may detect an object through the medium of an electromagnetic wave by employing a time of flight (TOF) scheme or a phase-shift scheme, and may detect a location of the detected object, the distance to the detected object, and the speed relative to the detected object.

The radar 1020 may be located at an appropriate position outside the vehicle 10 in order to sense an object located in front of the vehicle 10, an object located to the rear of the vehicle 10, or an object located to the side of the vehicle 10.

The lidar 1030 may include a laser transmission unit and a laser reception unit. The lidar 1030 may be implemented by the TOF scheme or the phase-shift scheme.

The lidar 1030 may be implemented as a drive type lidar or a non-drive type lidar.

When implemented as the drive type lidar, the lidar 1030 may rotate by a motor and detect an object in the vicinity of the vehicle 10.

When implemented as the non-drive type lidar, the lidar 1030 may utilize light steering technique to detect an object located within a predetermined distance from the vehicle 10. The vehicle may include a plurality of non-drive type lidars 1030.

The lidar 1030 may detect an object through the medium of laser light by employing the TOF scheme or the phase-shift scheme, and may detect a location of the detected object, a distance to the detected object, and a speed relative to the detected object.

The lidar 1030 may be located at an appropriate position outside the vehicle 10 in order to sense an object located in front of the vehicle 10, an object located to the rear of the vehicle 10, or an object located to the side of the vehicle 10.

The ultrasonic sensor 1040 may include an ultrasonic wave transmission unit and an ultrasonic wave reception unit. The ultrasonic sensor 1040 may detect an object based on an ultrasonic wave, and may detect a location of the detected object, a distance to the detected object, and a speed relative to the detected object.

The ultrasonic sensor 1040 may be located at an appropriate position outside the vehicle 10 in order to detect an object located in front of the vehicle 10, an object located to the rear of the vehicle 10, and an object located to the side of the vehicle 10.

The infrared sensor 1050 may include an infrared light transmission unit and an infrared light reception unit. The infrared sensor 1050 may detect an object based on infrared light, and may detect a location of the detected object, a distance to the detected object, and a speed relative to the detected object.

The infrared sensor 1050 may be located at an appropriate position outside the vehicle 10 in order to sense an object located in front of the vehicle 10, an object located to the rear of the vehicle 10, or an object located to the side of the vehicle 10.

The processor 1070 may control the overall operation of each unit of the object detection device 1000.

The processor 1070 may detect or classify an object by comparing sensing data of the camera 1010, the radar 1020, the lidar 1030, the ultrasonic sensor 1040, and the infrared sensor 1050 with prestored data.

The processor 1070 may detect and track an object based on acquired images. Using an image processing algorithm, the processor 1070 may calculate a distance to the object and a speed relative to the object.

For example, the processor 1070 may acquire information regarding a distance to the object and information regarding a speed relative to the object based on a variation in size of the object over time in acquired images.

For example, the processor 1070 may acquire information regarding a distance to the object or information regarding a speed relative to the object by employing a pin hole model or by profiling a road surface.

For example, the processor 1070 may acquire information regarding the distance to the object and information regarding the speed relative to the object based on information regarding disparity in stereo images acquired from the stereo camera 1010*a*.

The processor 1070 may detect and track an object based on a reflection electromagnetic wave which is formed as a result of reflection a transmission electromagnetic wave by the object. Based on the electromagnetic wave, the processor 1070 may, for example, calculate the distance to the object and the speed relative to the object.

The processor 1070 may detect and track an object based on a reflection laser light which is formed as a result of reflection of transmission laser by the object. Based on the laser light, the processor 1070 may, for example, calculate the distance to the object and the speed relative to the object.

The processor 1070 may detect and track an object based on a reflection ultrasonic wave which is formed as a result of reflection of a transmission ultrasonic wave by the object. Based on the ultrasonic wave, the processor 1070 may, for example, calculate the distance to the object and the speed relative to the object.

The processor 1070 may detect and track an object based on reflection infrared light which is formed as a result of reflection of transmission infrared light by the object. Based on the infrared light, the processor 1070 may, for example, calculate the distance to the object and the speed relative to the object.

In some implementations, the object detection device 1000 may include a plurality of processors 1070 or may not include the processor 1070. For example, each of the camera 1010, the radar 1020, the lidar 1030, the ultrasonic sensor 1040, and the infrared sensor 1050 may include its own processor.

Figure 13:
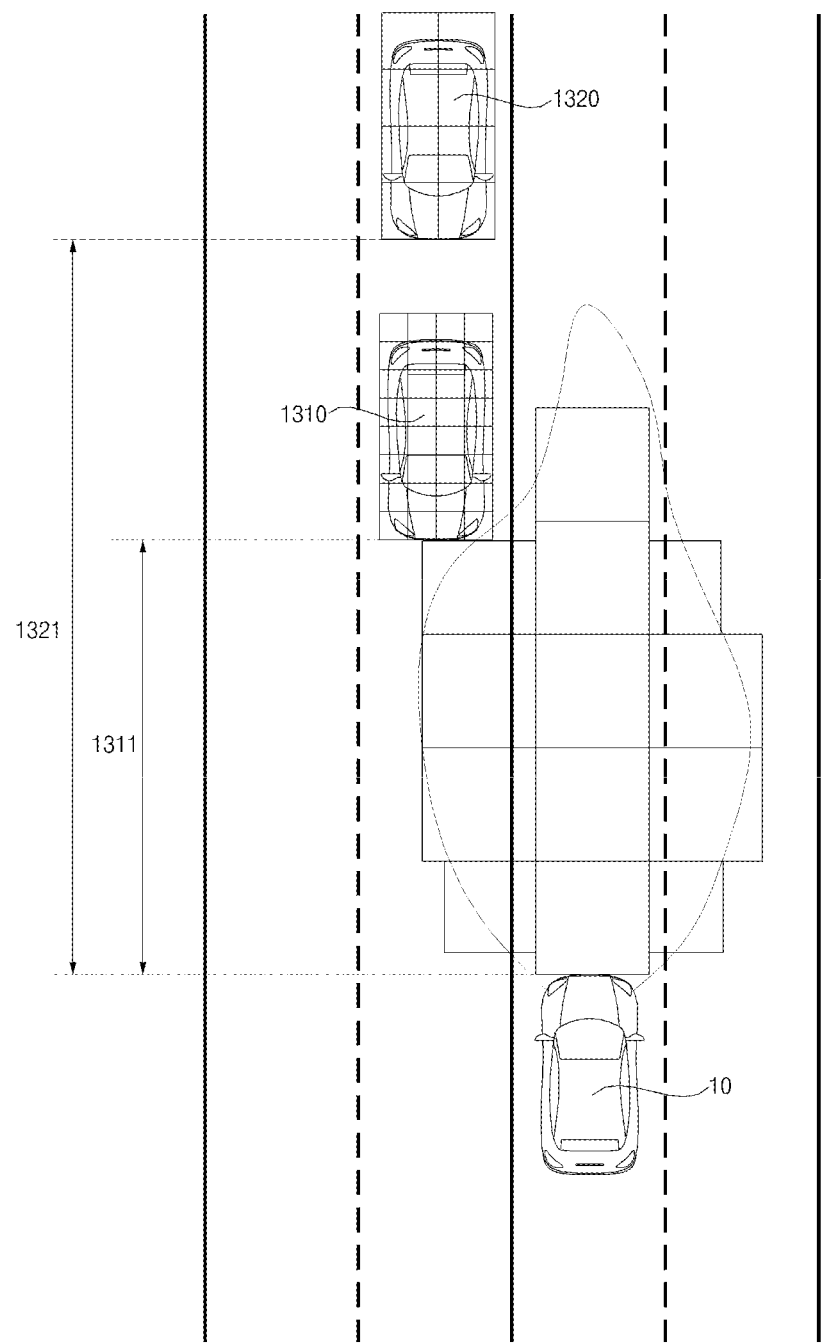
FIG. 13 is a diagram illustrating an example of adaptively controlling resolution of output light based on information regarding a distance between a vehicle and an object outside the vehicle according to an implementation.

FIG. 13 is a diagram illustrating of how to control resolution of output light based on information regarding a distance between a vehicle and an object according to an implementation.

Referring to FIG. 13, the processor 170 may acquire information regarding a distance between the vehicle and an object 1310 or 1320.

The processor 170 may control resolution of output light in a region corresponding to an object based on information regarding a distance between the vehicle 10 and the object 1310 or 1320.

For example, the processor 170 may control resolution of output light such that resolution of output light in a region corresponding to the object increases in inverse proportion to a distance between the vehicle 10 and an object.

As illustrated in FIG. 13, the processor 170 may receive information regarding a distance between the vehicle 10 and a first nearby vehicle 1310.

The processor 170 may control resolution of output light such that resolution of output light emitted toward the first nearby vehicle 1310 increases in inverse proportion to a distance between the vehicle 10 and the first nearby vehicle 1310.

The processor 170 may set a reference distance value. The processor 170 may control resolution of output light such that output light emitted toward the first nearby vehicle 1310 has a first resolution if a distance 1311 between the vehicle 10 and the first nearby vehicle 1310 is smaller than the reference distance value.

The processor 170 may receive information regarding a distance between the vehicle 10 and a second nearby vehicle 1320.

The processor 170 may control resolution of output light such that output light emitted toward the second nearby vehicle 1310 has a second resolution if a distance 1321 between the vehicle 10 and the second nearby vehicle 1320 is greater than the reference distance value.

Figure 14:
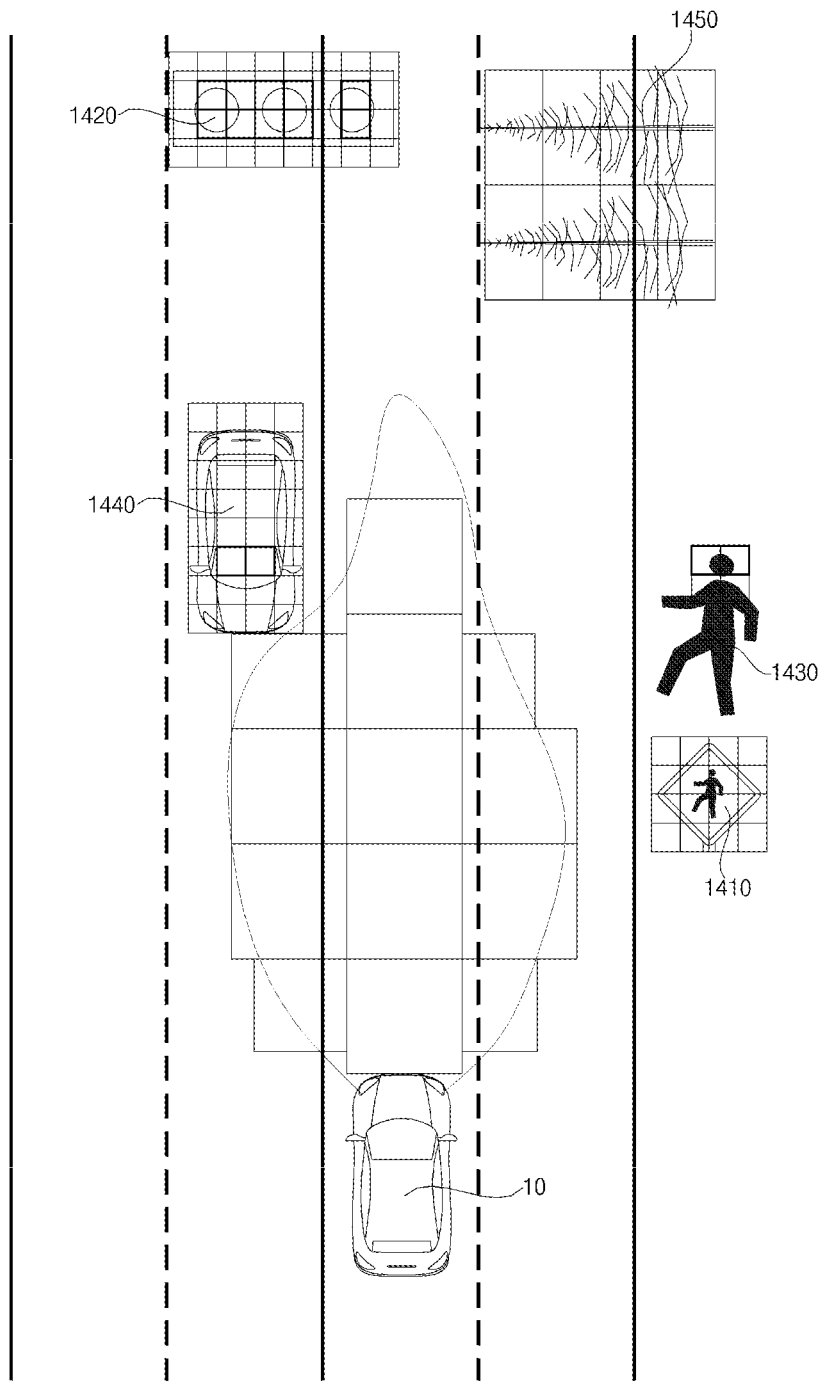
FIG. 14 is a diagram illustrating an example of adaptively controlling resolution of output light based on information regarding a type of an object outside the vehicle according to an implementation.

FIG. 14 is a diagram illustrating how to control resolution of output light based on information regarding a type of an object according to an implementation.

Referring to FIG. 14, the processor 170 may acquire information regarding a type of an object.

The processor 170 may control resolution of output light in a region corresponding to an object, based on information regarding a type of the object.

For example, if an object is a traffic sign plate 1410, a traffic light 1420, a person 1430, or a nearby vehicle 1440, the processor 170 may increase resolution of output light in a region corresponding to the object 1410, 1420, 1430, or 1440.

The traffic sign plate 1410, the traffic light 1420, the person 1430, and the nearby vehicle 1440 are objects considered significant to control travelling of the vehicle 10. Even at night, the object detection apparatus 1000 needs to acquire information regarding an object considered significant to control travelling of the vehicle 10. By increasing resolution of output light emitted toward the significant object, it is possible to enhance performance of the object detection apparatus 1000.

By increasing resolution of output light emitted toward the nearby vehicle 1440 and the person 1430, it is possible to more precisely control the light so as not to travel to a face of the driver of the nearby vehicle 1440 and a face of the person 1430.

The processor 170 may control resolution of output light emitted toward an insignificant object, such as a tree 1450, so as not to increase.

Figure 15:
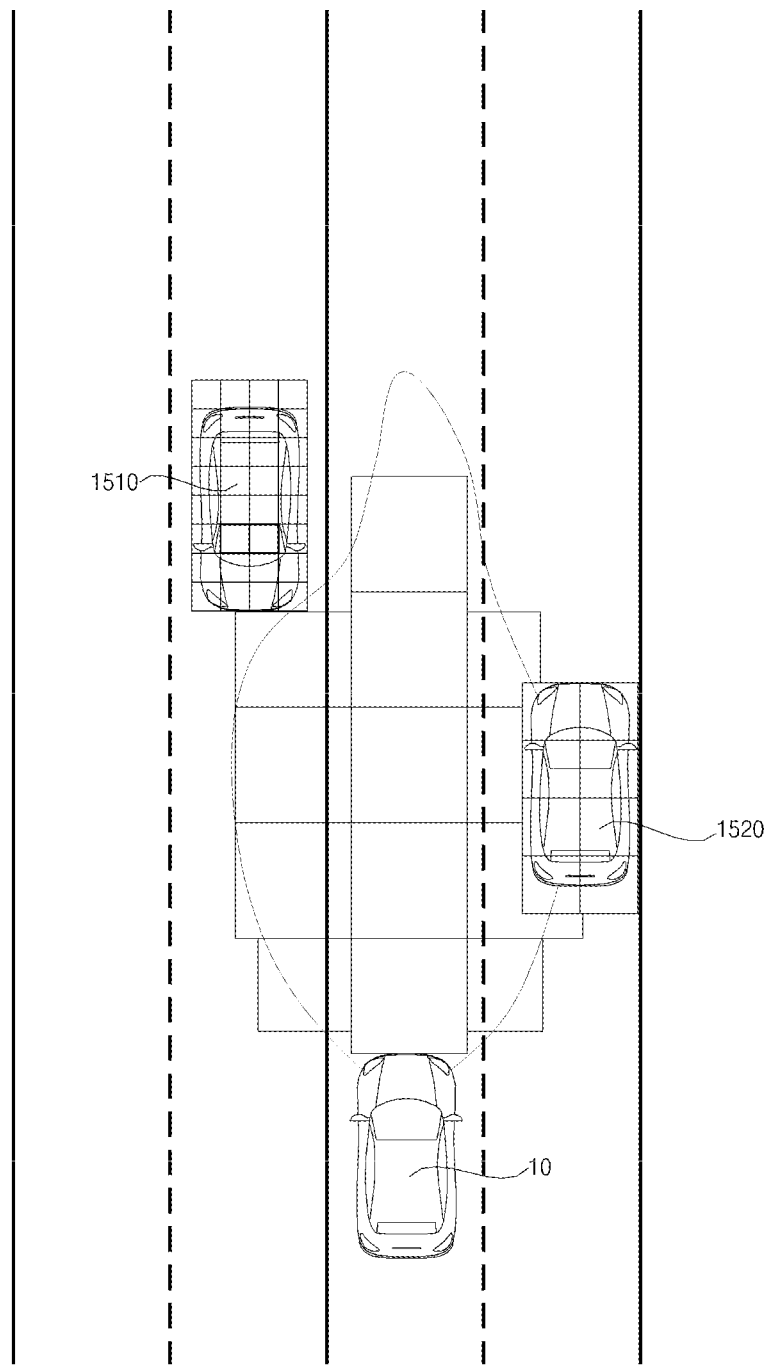
FIG. 15 is a diagram illustrating an example of adaptively controlling resolution of output light based on information regarding movement of an object outside the vehicle according to an implementation.

FIG. 15 is a diagram illustrating how to control resolution of output light based on information regarding movement of an object according to an implementation.

Referring to FIG. 15, the processor 170 may acquire information regarding an object 1510 or 1520.

Based on the information regarding movement of the object 1510 or 1520, the processor 170 may control resolution of output light in a region corresponding to the object 1510 or 1520.

For example, the processor 170 may receive information regarding movement of a first nearby vehicle 1510 or a second nearby vehicle 1520.

The first nearby vehicle 1510 may be moving.

The second vehicle 1520 may be stationary.

The processor 170 may increase resolution of first output light emitted toward the first nearby vehicle 1510, so that the resolution of the first output light emitted toward the first nearby vehicle 1510 is higher than resolution of second output emitted toward the second nearby vehicle 1520.

When the second nearby vehicle 1520 starts to move, the processor 170 may increase resolution of output light emitted toward the second nearby vehicle 1520.

It is necessary to more precisely control output light in response to a moving object than in response to a stationary object. In this case, resolution of output light is controlled based on information regarding movement of the object 1510 or 1520 so as to appropriately cope with any change.

Figure 16:
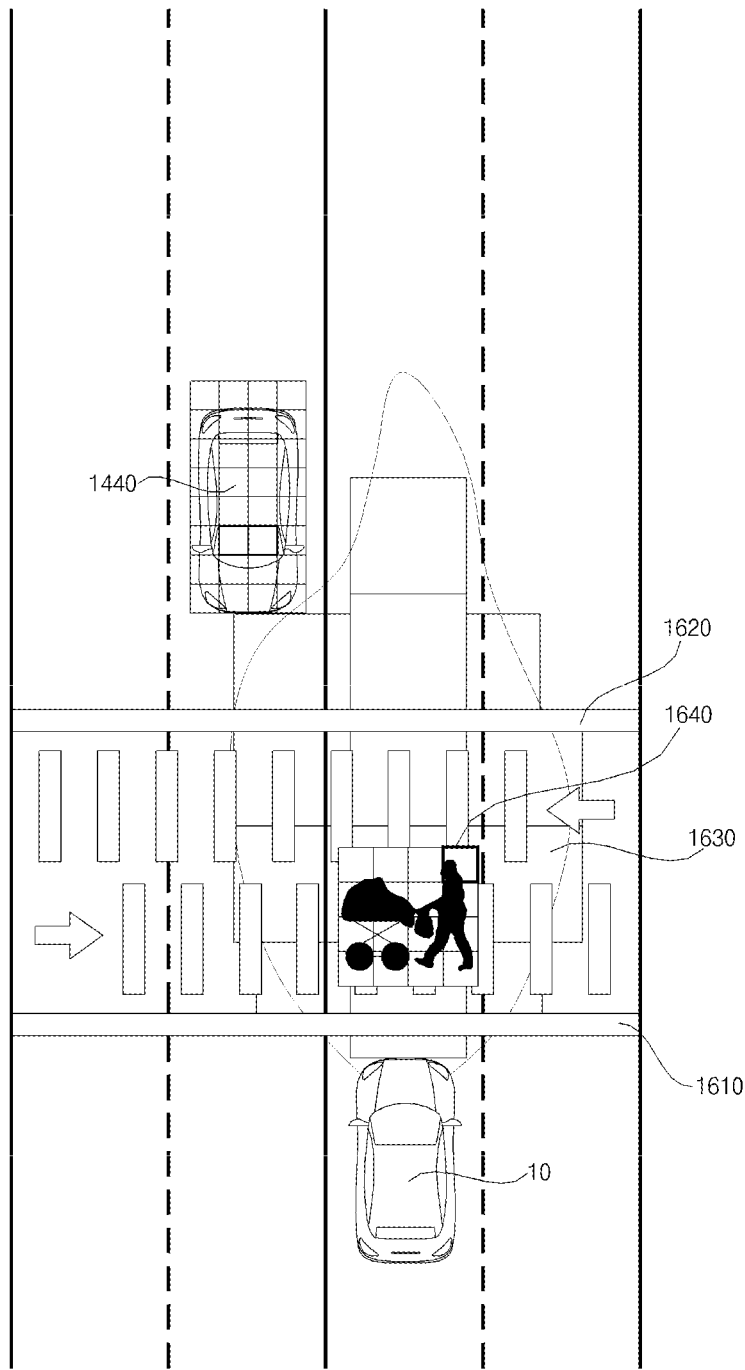
FIG. 16 is a diagram illustrating an example of adaptively controlling resolution of output light based on information regarding a region defined by lines on a roadway.

FIG. 16 is a diagram illustrating how to control resolution of output light based on information regarding a region defined by lines on a roadway.

Referring to FIG. 16, the processor 170 may acquire information regarding a region 1630 defined by lines 1610 and 1620 on a roadway.

For example, a region defined by lines may be a crosswalk or a parking space.

The processor 170 may control resolution of output light emitted toward the region 1630.

For example, the processor 170 may increase resolution of output light emitted to the region 1630.

As illustrated in 16, when a pedestrian 1640 crosses a road in a crosswalk 1630 defined by lines, the processor 170 may increase resolution of output light emitted toward the cross walk 1630, so that the resolution of the output light in the cross walk 1630 is higher than resolution in other regions.

In this case, output light is precisely controlled so as not to be emitted toward a face of the pedestrian 1640.

Figure 17:
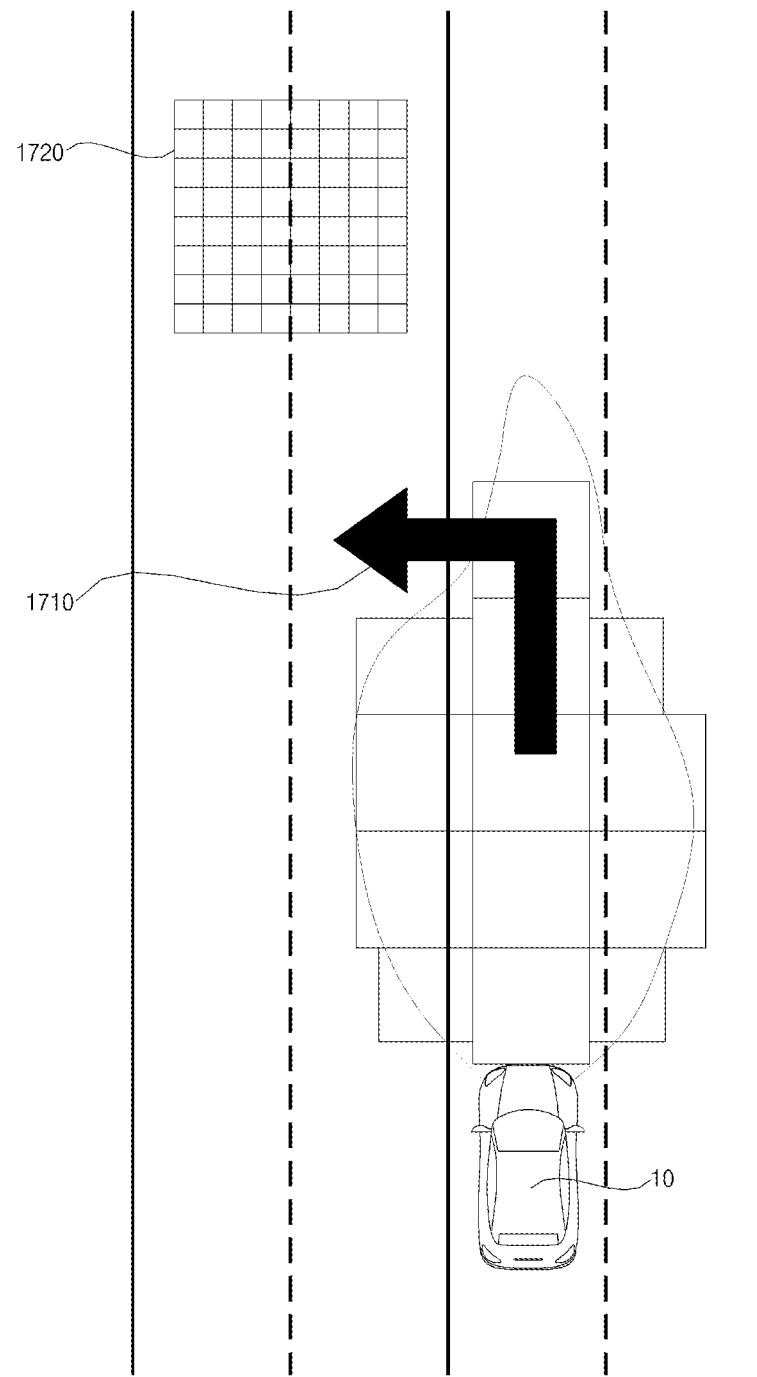
FIG. 17 is a diagram illustrating an example of adaptively controlling resolution of output light based on information regarding a direction of travel of a vehicle according to an implementation.

FIG. 17 is a diagram illustrating how to control resolution of output light based on information regarding a direction of travel of a vehicle according to an implementation.

Referring to FIG. 17, the processor 170 may acquire navigation information through the interface unit 130.

The navigation information may include information regarding a direction 1710 of travel of the vehicle 10.

The processor 170 may acquire information regarding the direction of travel of the vehicle 10.

The processor 170 may control resolution of output light from the lamp module 160 based on the information regarding the direction 1710 of travel of the vehicle 10.

For example, the processor 170 may increase resolution of output light in a region which corresponds to the direction 1710 of travel of the vehicle 10 over a light distribution area.

As illustrated in FIG. 17, the processor 170 may acquire planned-lane change information or planned-left/right turn information.

The processor 170 may increase resolution of output light in a region 1720 corresponding to a lane into which lane change is planned, so that the resolution of output light in the region 1720 is higher than resolution in other regions.

The processor 170 may increase resolution of output light in a region 1720 corresponding to a lane into which the vehicle 10 is about to enter by taking a left/right turn, so that the resolution of output light in the region 1720 is higher than resolution in other regions.

Figure 18:
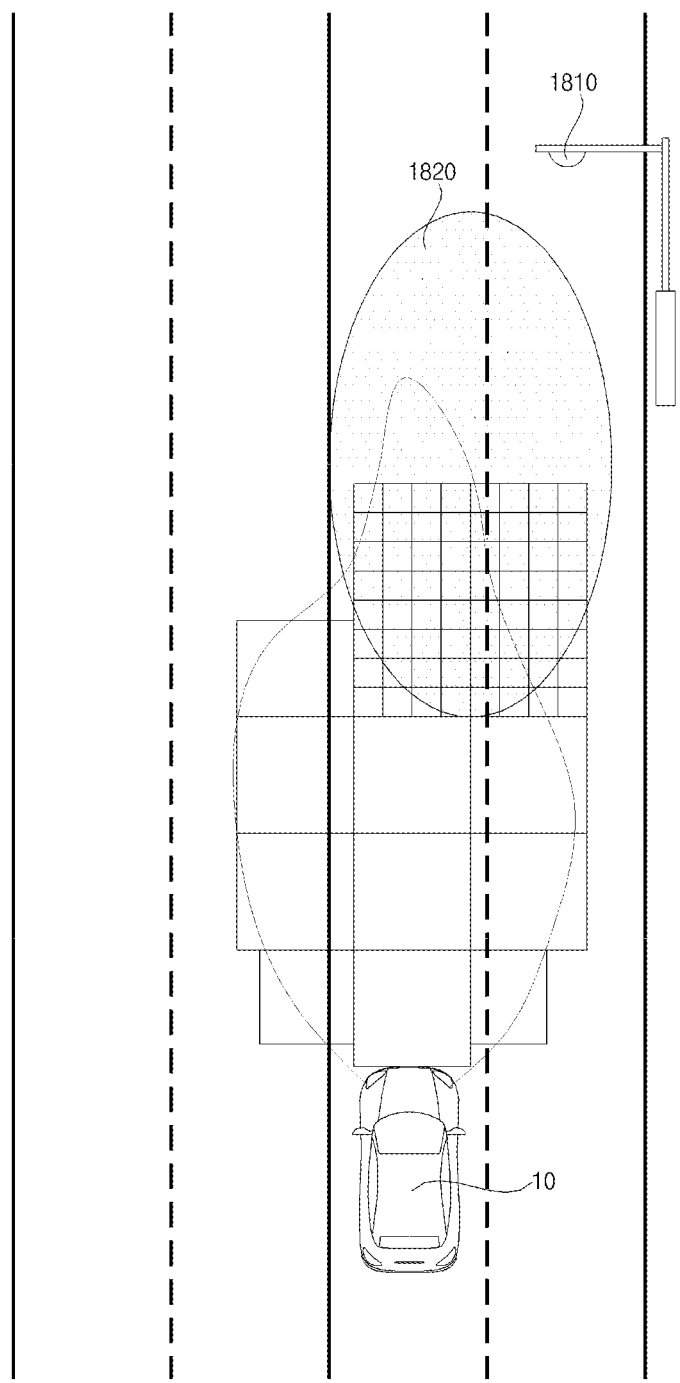
FIG. 18 is a diagram illustrating an example of adaptively controlling resolution of output light based on ambient information around the vehicle according to an implementation.

FIG. 18 is a diagram illustrating how to control resolution of output light based on ambient information according to an implementation.

Referring to FIG. 18, the processor 170 may acquire ambient illumination information.

For example, the processor 170 may acquire ambient illumination information which is generated based on images acquired from a camera included in the object detection apparatus 1000

For example, the processor 170 may acquire ambient illumination information from the sensing unit 120.

The processor 170 may control resolution of output light from the lamp module 160 based on illumination information.

For example, the processor 170 may increase resolution of output light in a region of a light distribution area, the region in which illumination is high because of emission of light from a different light source (for example, a streetlight, a lamp of a nearby vehicle, etc.).

As illustrated in FIG. 18, a streetlight 1810 may emit light in a first region 1820 on a road surface.

The lamp 100 may emit light to a part of the first region 1820.

In this case, light emitted from the street light 1820 and light emitted from the lamp 100 may overlap in the part of the first region.

The processor 170 may increase resolution of output light in a partial region of a light distribution area of the lamp 100, the partial region which overlaps a first region 1820 to which light is emitted by the street light 1810.

In this manner, it is possible to increase energy efficiency.

Figure 19:
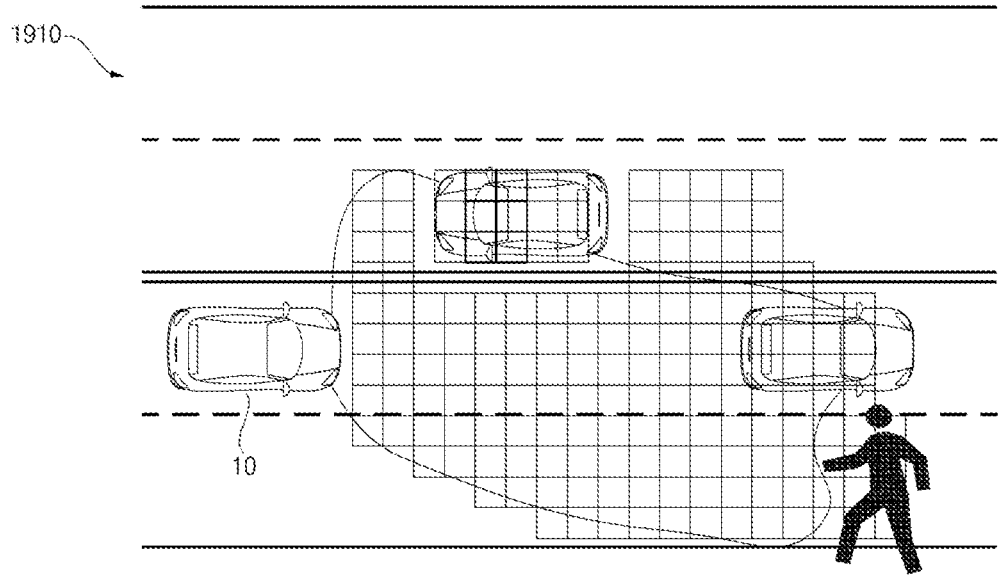
FIG. 19 is a diagram illustrating an example of adaptively controlling resolution of output light based on driving environment information according to an implementation.
Figure 19:
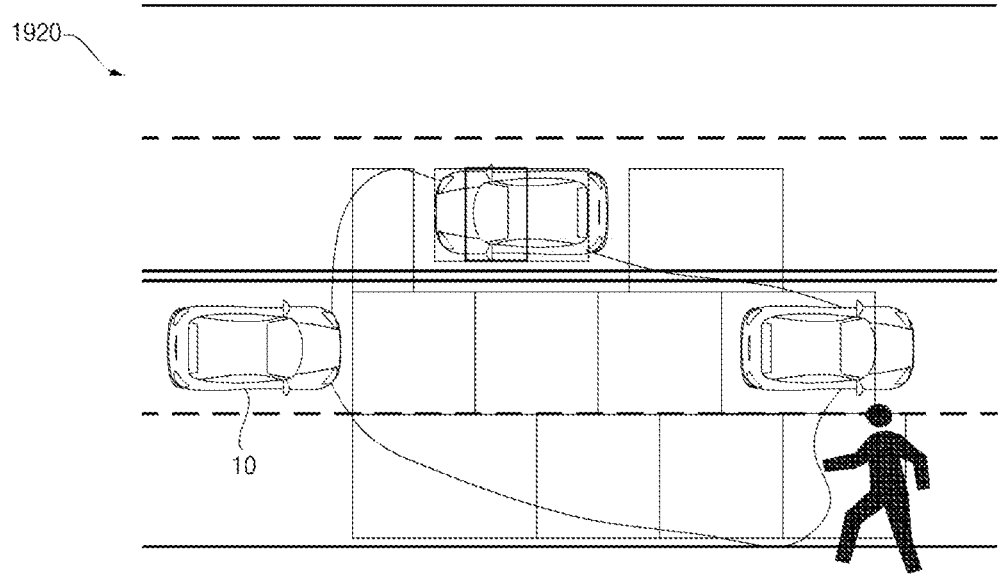

FIG. 19 is a diagram illustrating how to control resolution of output light based on driving environment information according to an implementation.

Referring to FIG. 19, reference numeral 1910 indicates the case where visibility is poor due to bad weather. Reference numeral 1920 indicates the case of good weather.

The processor 170 may acquire weather condition information.

The processor 170 may acquire weather condition information through a communication apparatus provided in the vehicle 10.

The processor 170 may acquire weather condition information through the object detection apparatus 1000.

In the case 1910 where visibility is poor due to bad weather, such as snow, rain, and fog, the processor 170 may increase resolution of output light, so that the resolution in the case 1910 is higher than resolution in the case 1920 of good weather.

Figure 20A:
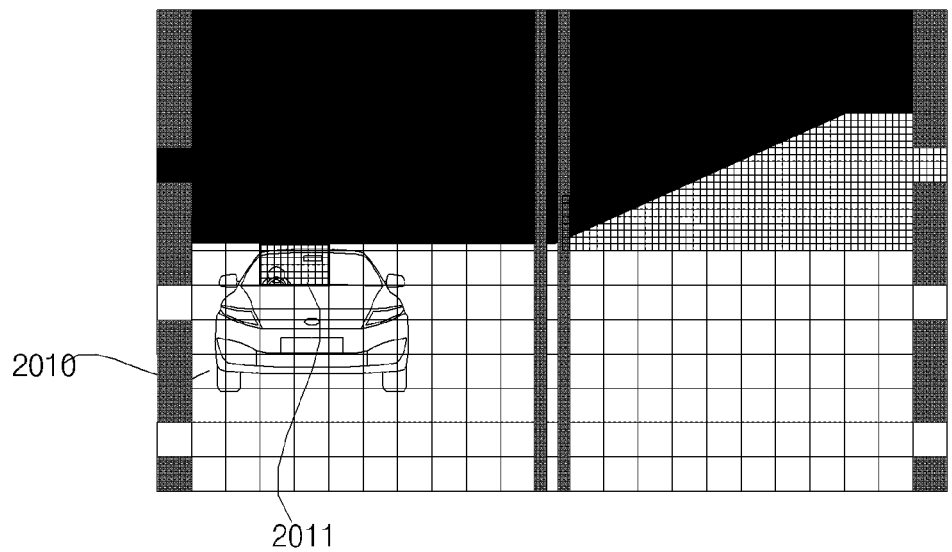
FIGS. 20A and 20B are diagrams illustrating examples of adaptively controlling resolution of output light based on information regarding a nearby vehicle according to an implementation.
Figure 20B:
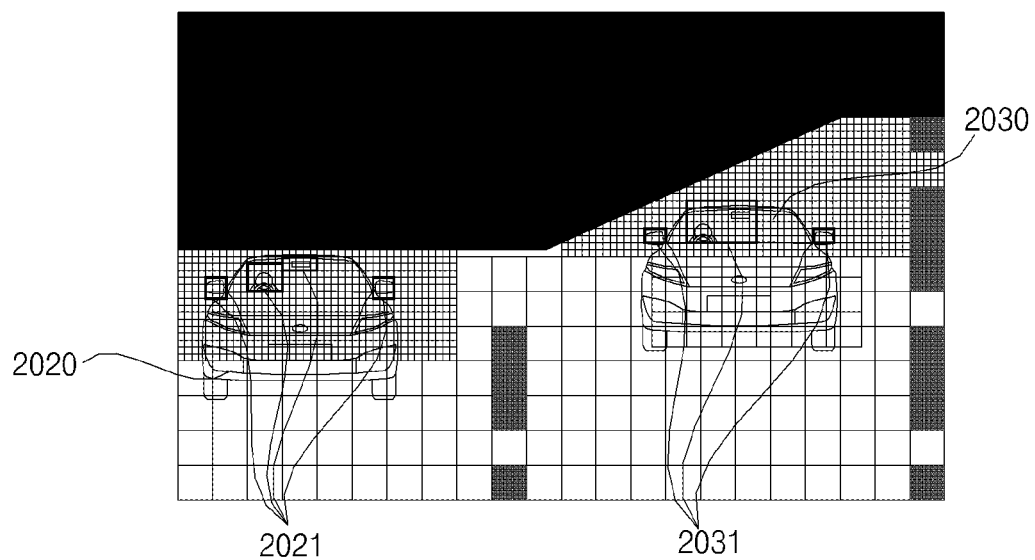

FIGS. 20A and 20B are diagrams illustrating how to control resolution of output light based on information regarding a nearby vehicle according to an implementation.

Referring to FIG. 20A, the processor 170 may increase resolution of output light in a region corresponding to a nearby vehicle 2010 which is travelling in a direction opposite to a direction in which the vehicle 10 is travelling, so that the resolution of output light in the corresponding region is higher than resolution in other regions.

The processor 170 may precisely control light so as not to be emitted toward a windshield of the nearby vehicle 2010.

The processor 170 may precisely control light so as not to be emitted toward a driver 2011 of the nearby vehicle 2010.

Referring to FIG. 20B, the processor 170 may increase resolution of output light in a region corresponding to a nearby vehicle 2020 which is a preceding vehicle travelling in the same lane, so that the resolution of output light in the corresponding region is higher than resolution in other regions.

The processor 170 may control light so as not to be emitted toward a rear windshield of the nearby vehicle 2020.

The processor 170 may precisely control light so that the light is not emitted toward at least one of a rear-view mirror, a side-view mirror, and a driver 2021 of the nearby vehicle 2020.

The processor 170 may increase resolution of output light in a region corresponding to a nearby vehicle 2030 which is a preceding vehicle travelling in a next lane, so that the resolution of output light in the corresponding region is higher than resolution in other regions.

The processor 170 may control light, so that the light is not emitted toward a rear windshield of the nearby vehicle 2030.

The processor 170 may precisely control light so as not to be emitted toward at least one of a rear-view mirror, a side-mirror, and a driver 2031 of the nearby vehicle 2030.

The present disclosure as described above may be implemented as code that can be written on a computer-readable medium in which a program is recorded and thus read by a computer. The computer-readable medium includes all kinds of recording devices in which data is stored in a computer-readable manner. Examples of the computer-readable recording medium may include a hard disk drive (HDD), a solid state disk (SSD), a silicon disk drive (SDD), a read only memory (ROM), a random access memory (RAM), a compact disk read only memory (CD-ROM), a magnetic tape, a floppy disc, and an optical data storage device. In addition, the computer-readable medium may be implemented as a carrier wave (e.g., data transmission over the Internet). In addition, the computer may include a processor or a controller. Thus, the above detailed description should not be construed as being limited to the implementations set forth herein in all terms, but should be considered by way of example. The scope of the present disclosure should be determined by the reasonable interpretation of the accompanying claims and all changes in the equivalent range of the present disclosure are intended to be included in the scope of the present disclosure.

Although implementations have been described with reference to a number of illustrative implementations thereof, it should be understood that numerous other modifications and implementations can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternatives uses will also be apparent to those skilled in the art.

What is claimed is:

1. A lamp for a vehicle, comprising:
a lamp module configured to emit light;
at least one processor;
an interface unit connected with the at least one processor and configured to receive information; and
a computer-readable medium having stored thereon instructions that, when executed by the at least one processor, cause the at least one processor to perform operations comprising:
receiving, through the interface unit, driving situation information of the vehicle; and
controlling, based on the driving situation information, a resolution of light that is output from the lamp module,
wherein controlling the resolution of light comprises controlling the lamp module to change a size of a smallest differentially illuminable area that is illuminated on a surface at a first distance from the lamp.

2. The lamp according to claim 1, wherein the operations further comprise:
acquiring information regarding an object located outside of the vehicle;
dividing a light distribution area of the lamp module into a first region corresponding to the object and a second region not corresponding to the object; and
controlling a resolution of light that is output in the first region differently from a resolution of light that is output in the second region.

3. The lamp according to claim 2, wherein controlling the resolution of light that is output in the first region differently from the resolution of light that is output in the second region comprises:
controlling the lamp module to illuminate the first region with a first smallest differentially illuminable area having a first size; and
controlling the lamp module to illuminate the second region with a second smallest differentially illuminable area having a second size that is different from the first size.

4. The lamp according to claim 2, wherein the operations further comprise:
acquiring information regarding a relative movement of the object; and
changing, based on the information regarding the relative movement of the object, a location of the first region that is illuminated by the lamp.

5. The lamp according to claim 1, wherein the lamp module comprises:
a light emitting unit connected with the at least one processor and configured to operate based on a control signal from the at least one processor; and
a patterning unit communicated with the at least one processor and configured to change a pattern of light generated by the light emitting unit,
wherein the patterning unit comprises at least one of a Digital Micro-mirror Device (DMD) module, a Micro Electro Mechanical System (MEMS) scanner module, or a transparent display.

6. The lamp according to claim 1, wherein the lamp module further comprises a Light Emitting Diode (LED) array comprising a plurality of LEDs that form a matrix array.

7. The lamp according to claim 1, wherein the operations further comprise:
controlling a resolution of light that is output in an entire region of a light distribution area of the lamp module.

8. The lamp according to claim 1, wherein the operations further comprise:
controlling a resolution of light that is output in a partial region of a light distribution area of the lamp module.

9. The lamp according to claim 8, wherein the partial region is located around a cut-off line of a low beam or a high beam generated by the lamp module.

10. The lamp according to claim 1, wherein the operations further comprise:
acquiring information regarding an object located outside of the vehicle; and
controlling, based on the information regarding the object, a resolution of light that is output from the lamp module.

11. The lamp according to claim 10, wherein the operations further comprise:
acquiring information regarding a distance between the vehicle and the object; and
controlling, based on the information regarding the distance between the vehicle and the object, a resolution of light that is output in a region corresponding to the object.

12. The lamp according to claim 11, wherein the operations further comprise:
controlling the resolution of the light that is output by increasing the resolution of light that is output in the region corresponding to the object in inverse proportion to a distance between the vehicle and the object.

13. The lamp according to claim 10, wherein the operations further comprise:
acquiring information regarding a type of the object; and
controlling a resolution of light that is output in a region corresponding to the type of the object.

14. The lamp according to claim 13, wherein the operations further comprise:
increasing the resolution of the light that is output in the region corresponding to the object based on a determination that the type of the object is a traffic sign plate, a traffic light, a person, or a nearby vehicle.

15. The lamp according to claim 10, wherein the operations further comprise:
acquiring information regarding a movement of the object; and
controlling the resolution of the light that is output in a region corresponding to the movement of the object.

16. The lamp according to claim 15, wherein the operations further comprise:
in a state in which the object is moving, increasing the resolution of the light that is output in a region corresponding to the movement of the object.

17. The lamp according to claim 10, wherein the operations further comprise:
acquiring information regarding a region defined by lines on a roadway; and
controlling the resolution of light that is emitted to the region defined by the lines on the roadway.

18. The lamp according to claim 17, wherein the operations further comprise:
increasing the resolution of the light that is emitted to the region defined by the lines.

19. The lamp according to claim 1, wherein the operations further comprise:
acquiring information regarding a direction of travel of the vehicle; and
controlling, based on the information regarding the direction of travel of the vehicle, the resolution of the light that is output from the lamp.

20. The lamp according to claim 1, wherein the operations further comprise:
acquiring ambient illumination information; and
controlling, based on the ambient illumination information, the resolution of the light that is output from the lamp module.

21. A vehicle comprising:
a plurality of wheels;
a power source configured to drive a rotation of at least one of the plurality of wheels; and
a lamp comprising:
a lamp module configured to emit light;
at least one processor;
an interface unit connected with the at least one processor and configured to receive information; and
a computer-readable medium having stored thereon instructions that, when executed by the at least one processor, cause the at least one processor to perform operations comprising:
receiving, through the interface unit, driving situation information of the vehicle; and
controlling, based on the driving situation information, a resolution of light that is output from the lamp module,
wherein controlling the resolution of light comprises controlling the lamp module to change a size of a smallest differentially illuminable area that is illuminated on a surface at a first distance from the lamp.

* * * * *